United States Patent
Tsubaki et al.

(10) Patent No.: US 10,689,026 B2
(45) Date of Patent: Jun. 23, 2020

(54) CONTROL DEVICE FOR ELECTRIC POWER STEERING DEVICE

(71) Applicant: NSK LTD., Tokyo (JP)

(72) Inventors: Takahiro Tsubaki, Maebashi (JP); Osamu Tatewaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/311,330

(22) PCT Filed: Aug. 22, 2017

(86) PCT No.: PCT/JP2017/029971
§ 371 (c)(1),
(2) Date: Dec. 19, 2018

(87) PCT Pub. No.: WO2018/038110
PCT Pub. Date: Mar. 1, 2018

(65) Prior Publication Data
US 2019/0193776 A1 Jun. 27, 2019

(30) Foreign Application Priority Data

Aug. 26, 2016 (JP) .................... 2016-165765
Aug. 26, 2016 (JP) .................... 2016-165948

(51) Int. Cl.
*B62D 5/04* (2006.01)
*B62D 15/02* (2006.01)
*B62D 6/04* (2006.01)

(52) U.S. Cl.
CPC .......... *B62D 5/049* (2013.01); *B62D 5/0484* (2013.01); *B62D 6/04* (2013.01); *B62D 15/025* (2013.01);
(Continued)

(58) Field of Classification Search
CPC ........ B62D 5/049; B62D 6/04; B62D 5/0484; B62D 15/0235; B62D 15/025; B62D 15/0245
(Continued)

(56) References Cited

U.S. PATENT DOCUMENTS 4,773,012 A * 9/1988 Ito .................... B62D 7/159
180/422
9,387,877 B2 * 7/2016 Tsubaki ................. B62D 1/286
(Continued)

FOREIGN PATENT DOCUMENTS

EP 2942264 A1 11/2015
JP 61-027763 A 2/1986
(Continued)

OTHER PUBLICATIONS

International Preliminary Report on Patentability for PCT/JP2017/029971, dated Sep. 6, 2018.
(Continued)

*Primary Examiner* — Muhammad Shafi
(74) *Attorney, Agent, or Firm* — Sughrue Mion, PLLC

(57) ABSTRACT

There is provided a control device for an electric power steering device, which determines an estimate of a steering angle instead of using an angle sensor when any abnormality is detected in the angle sensor to perform steering angle control using the determined estimate of the steering angle. When it is determined that the detected steering angle is normal based on a steering angle abnormality determination signal Flg_θh, a steering angle calculating section 201 outputs a steering-wheel angle θh as an actual steering angle θr, while when it is determined that the detected steering angle is abnormal, the steering angle calculating section 201 determines and outputs an estimate θr of an actual steering angle using a past value Zθr of the actual steering angle
(Continued)

under normal conditions, a motor relative angle $\Delta\theta m$, and a relative twist angle $\Delta\theta$ of a torsion bar.

3 Claims, 22 Drawing Sheets

(52) U.S. Cl.
CPC ...... *B62D 15/0235* (2013.01); *B62D 15/0245* (2013.01)
(58) Field of Classification Search
USPC .......................................................... 701/41
See application file for complete search history.

(56) References Cited

U.S. PATENT DOCUMENTS

| | | | | |
|---|---|---|---|---|
| 9,637,166 | B2* | 5/2017 | Tsubaki | ................ B62D 6/002 |
| 2004/0188172 | A1* | 9/2004 | Asada | ................ B62D 5/0484 |
| | | | | 180/446 |
| 2014/0019009 | A1* | 1/2014 | Kogiso | .............. B62D 15/0235 |
| | | | | 701/42 |
| 2015/0191199 | A1* | 7/2015 | Tsubaki | ................ B62D 1/286 |
| | | | | 701/42 |
| 2016/0016606 | A1* | 1/2016 | Tsubaki | ............... B62D 5/0463 |
| | | | | 701/41 |

FOREIGN PATENT DOCUMENTS

| | | |
|---|---|---|
| JP | 2004-017881 A | 1/2004 |
| JP | 2004-291923 A | 10/2004 |
| JP | 3912279 B | 5/2007 |
| JP | 3917008 B | 5/2007 |
| JP | 4097134 B | 6/2008 |
| JP | 2013-193490 A | 9/2013 |
| JP | 2015-061421 A | 3/2015 |
| JP | 2016-145036 A | 8/2016 |
| WO | 2014/136516 A1 | 9/2014 |
| WO | 2014/162769 A1 | 10/2014 |

OTHER PUBLICATIONS

International Search Report for PCT/JP2017/029971, dated Nov. 7, 2017.

* cited by examiner

CONTROL DEVICE FOR ELECTRIC POWER STEERING DEVICE

CROSS REFERENCE TO RELATED APPLICATIONS

This Application is a National Stage of International Application No. PCT/JP2017/029971 filed Aug. 22, 2017, claiming priority based on Japanese Patent Application No. 2016-165765 filed Aug. 26, 2016 and 2016-165948 filed Aug. 26, 2016.

TECHNICAL FIELD

The present invention relates to a control device for an electric power steering device.

BACKGROUND ART

Conventionally, an electric power steering (EPS) in an automotive steering system has been proposed and become commercially practical. An electric power steering device configured to generate an auxiliary steering torque using an electric motor according to the steering torque applied to a steering wheel and transmit this auxiliary steering torque to a steering shaft is currently under development. In such an electric power steering device, the motor is connected to the steering shaft through a speed-reduction mechanism so that the rotation of the motor will be transmitted to the steering shaft after being decelerated by the speed-reduction mechanism.

Further, attention has been focused on autonomous driving technology to steer a vehicle automatically in recent years, and various techniques have been developed. When automatic steering is realized in an electric power steering device, structures having steering angle control (to calculate and control a motor electric current command value used to make the steering angle of the steering follow a desired angle) and assist control (feedback control of motor electric current to generate the torque of an auxiliary steering force accurately when the auxiliary steering force (assist) is applied to the steering mechanism by the rotational force of the motor, and the like) independently to switch between these outputs are adopted (for example, see Patent Documents 1 to 3). The steering angle control method will be described in detail. Since there is a need to detect a steering angle (absolute steering angle) of the steering in some way, the steering angle has conventionally been detected by using an angle sensor, such as a steering-wheel angle sensor, a column steering angle sensor, or a wheel steering angle sensor (for example, see Patent Document 4).

CITATION LIST

Patent Document

Patent Document 1: Japanese Patent No. 3912279
Patent Document 2: Japanese Patent No. 3917008
Patent Document 3: Japanese Patent Application Laid-Open No. 2004-017881
Patent Document 4: Japanese Patent No. 4097134

SUMMARY

Technical Problem

However, when a steering wheel operation (steering operation) by a driver intervenes during autonomous driving, the intervention operation may not be fully reflected. Further, when the operation intervenes, the driver may have a feeling of strangeness and a feeling of discomfort. Further, when an abnormality occurs in the angle sensor used to detect the steering angle, a large discrepancy occurs between an actual steering angle and a detected steering angle to cause a problem that appropriate steering angle control cannot be performed.

<Problem 1 (Feeling of Strangeness Upon Driver's Intervention During Autonomous Driving, and Compatibility Between Steering Angle Control and Assist Control)>

Position and speed control having excellent responsiveness to a steering angle command and excellent disturbance suppression performance against a road surface reaction force and the like is used for steering angle control. For example, P control (proportional control) is used in a position control section and PI control (proportional-integral control) is used in a speed control section. Suppose that command values as respective outputs of steering angle control and assist control are switched. In this case, for example, when abrupt switching is done by driver's switch input, the command values change abruptly to make the behavior of the steering wheel unnatural, giving the driver a feeling of strangeness. Therefore, a technique to multiply the steering angle control command value and the assist control command value by respective gradual change gains (gradually changing gains) so as to switch between the outputs gradually in order to suppress the abrupt change in electric current command value is used (see Patent Document 3, or the like).

However, in this technique, since the steering angle control command value is restricted by the gradual change gain during switching and output to the electric current command value, the output of the electric current command value becomes smaller than the steering angle control command value by a restricted amount. Since this restriction slows down the actual speed of the motor compared with a steering angular velocity command value, a deviation is generated between the steering angular velocity command value and the actual speed, and hence integral values of I control (integral control) in the speed control are accumulated, thereby outputting a further large steering angle control command value from the speed control. As a result, in such a state that the gradual change gain for the assist control command value grows gradually larger, the restriction by the gradual change gain is relaxed. Therefore, the steering angle control command value becomes an excess value as the gradual change gain grows larger to make the steering wheel respond excessively to the steering angular velocity command value in such a sense that the steering wheel gets caught, giving the driver a feeling of strangeness and a feeling of discomfort.

<Problem 2>

In the first place, in a method according to the related art technique including the above problem 1 (for example, see Patent Document 3), P control is performed on the steering angle deviation and PI control is performed for speed control. When there is an intervention of manual input by the driver during steering angle control, steering angle control naturally operates to follow the steering angle command value, and this makes it difficult to turn the steering wheel manually until the "switching operation" from steering angle control to assist control is carried out. Further, since a time delay is generated by the "manual input detection" and "switching operation," the intervention of a steering operation by the driver may not be fully performed.

<Problem 3>

If steering angle control can be performed in such a manner that, when any abnormality is detected in the angle sensor, an estimate of the steering angle is determined instead of using the angle sensor to perform steering angle control using the determined estimate of the steering angle, while when no abnormality occurs in the angle sensor, steering angle control is performed by using the angle sensor, accurate steering angle control can be realized even though an abnormality occurs in the angle sensor. However, a device performing such a function is not yet provided.

The present invention has been made in view of the circumstances described above, and it is an object thereof to provide an electric power steering device capable of solving at least any of the above-described problems, i.e., capable of fully reflecting an intervention operation when a steering wheel operation (steering) by a driver intervenes during autonomous driving of a vehicle and reducing a feeling of strangeness and a feeling of discomfort given to the driver when the operation intervenes, or a control device for an electric power steering device, which determines an estimate of a steering angle instead of using an angle sensor when any abnormality is detected in the angle sensor to perform steering angle control using the determined estimate of the steering angle.

Solution to Problem

In order to solve such a problem, a control device for an electric power steering device according to one embodiment of the present invention is a control device for an electric power steering device, which applies an auxiliary steering force to a steering mechanism of a vehicle using the rotational force of a motor, including a steering angle control section to which a steering angle command value $\theta$ref calculated based on a target trajectory of the vehicle is input to control a steering angle of the steering mechanism based on the input steering angle command value $\theta$ref, wherein the steering angle control section includes: a steering angle calculating section which outputs a detected steering-wheel angle $\theta$h as an actual steering angle $\theta$r when an input steering angle abnormality determination signal indicates normal, or determines an estimate $\theta$r of the actual steering angle of the steering mechanism using an input motor angle $\theta$m and outputs the estimate $\theta$r as an actual steering angle estimate $\theta$r when the steering angle abnormality determination signal indicates abnormal; and a position control section which derives a steering angular velocity command value $\omega$ref based on an input target steering angle $\theta$t and the actual steering angle $\theta$r or the actual steering angle estimate $\theta$r.

Here, in the above configuration, it is preferred that the steering angle calculating section should determine the actual steering angle estimate $\theta$r using an input steering torque Tt together with the motor angle $\theta$m when the steering angle abnormality determination signal indicates abnormal.

Further, in the above configuration, it is preferred that the steering angle calculating section should derive the actual steering angle estimate $\theta$r using a past value Z$\theta$r of the actual steering angle under normal conditions, a motor relative angle $\Delta\theta$m, and a relative twist angle $\Delta\theta$ of a torsion bar when the steering angle abnormality determination signal indicates abnormal.

Further, in the above configuration, it is preferred that the steering angle calculating section should derive the actual steering angle estimate $\theta$r using a past value Z$\theta$r of the actual steering angle under normal conditions and a motor relative angle $\Delta\theta$m when the steering angle abnormality determination signal indicates abnormal.

Further, a control device for an electric power steering device according to another aspect of the present invention is a control device for an electric power steering device, which applies an auxiliary steering force to a steering mechanism of a vehicle using the rotational force of a motor, including a steering angle control section to which a steering angle command value $\theta$ref calculated based on a target trajectory of the vehicle is input to control a steering angle of the steering mechanism based on the input steering angle command value $\theta$ref, wherein the steering angle control section includes: a steering angle calculating section which outputs a detected steering-wheel angle $\theta$h as an actual steering angle $\theta$r when an input steering angle abnormality determination signal indicates normal, or determines an estimate $\theta$r of the actual steering angle of the steering mechanism using an input actual steering angular velocity $\omega$r and outputs the estimate $\theta$r as an actual steering angle estimate $\theta$r when the steering angle abnormality determination signal indicates abnormal; and a position control section which derives a steering angular velocity command value $\omega$ref based on an input target steering angle $\theta$t and the actual steering angle $\theta$r or the actual steering angle estimate $\theta$r.

Here, in the above configuration, it is preferred that the steering angle calculating section should determine the actual steering angle estimate $\theta$r using an input steering torque Tt together with the actual steering angular velocity $\omega$r when the steering angle abnormality determination signal indicates abnormal.

Further, in the above configuration, it is preferred that the steering angle calculating section should derive the actual steering angle estimate $\theta$r using a past value Z$\theta$r of the actual steering angle under normal conditions, a time integral value S of the actual steering angular velocity $\omega$r, and a relative twist angle $\Delta\theta$ of a torsion bar when the steering angle abnormality determination signal indicates abnormal.

Further, in the above configuration, it is preferred that the steering angle calculating section should derive the actual steering angle estimate $\theta$r using a past value Z$\theta$r of the actual steering angle under normal conditions and a time integral value S of the actual steering angular velocity $\omega$r when the steering angle abnormality determination signal indicates abnormal.

Advantageous Effects of Invention

According to the present invention, when a steering wheel operation (steering) by a driver intervenes during autonomous driving of a vehicle, the intervention operation can be fully reflected, and a feeling of strangeness and a feeling of discomfort, which may be given to the driver when the operation intervenes, can be reduced, or when any abnormality is detected in an angle sensor, an estimate of a steering angle can be determined instead of using the angle sensor to perform steering angle control using the determined estimate of the steering angle.

DESCRIPTION OF EMBODIMENTS

Figure 1:
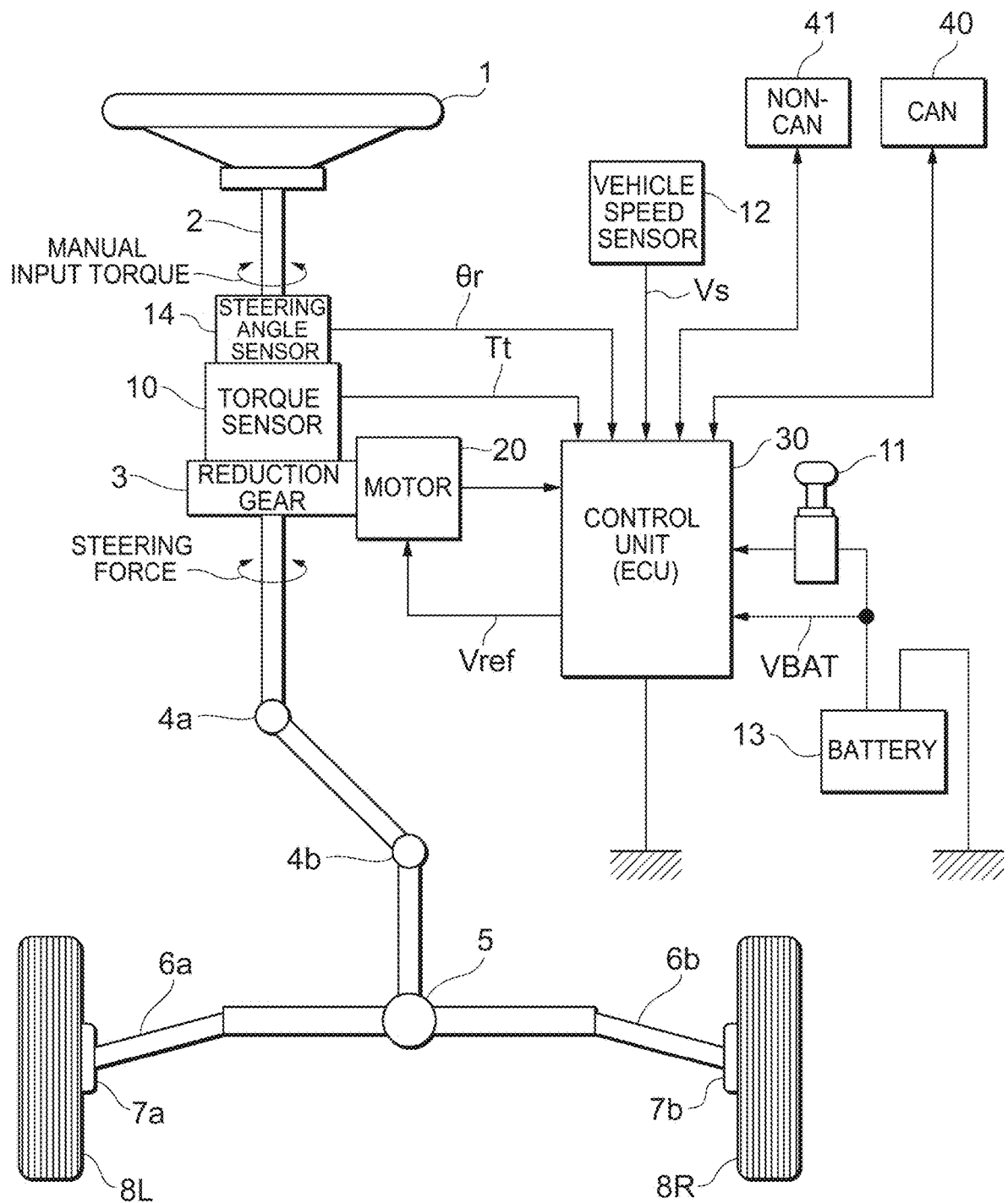
FIG. 1 is a configuration diagram illustrating an outline of an electric power steering device.

A preferred embodiment of an electric power steering device according to the present invention will be described below with reference to the accompanying drawings (see FIG. 1, and the like). Note that components having substantially the same functional configuration in this specification and drawings are given the same reference numerals to omit redundant description.

The configuration of an electric power steering device 100 will be illustrated and described (see FIG. 1). The electric power steering device 100 is a device that applies an auxiliary steering force to a steering mechanism of a vehicle by the rotational force of a motor. A column shaft (steering shaft) 2 of a steering wheel 1 is connected to steered wheels 8L, 8R via a reduction gear 3, universal joints 4a, 4b, a pinion-rack mechanism 5, and tie rods 6a, 6b, and further through hub units 7a, 7b. A torsion bar and a steering wheel shaft are arranged on the same axis as the column shaft 2.

Further, a steering angle sensor 14 that detects a steering angle θr of the steering wheel 1 and a torque sensor 10 that detects a steering torque Tt are provided around the column shaft 2, and a motor 20 that assists a steering force of the steering wheel 1 is connected to the column shaft 2 through the reduction gear 3.

To a control unit (ECU) 30 that controls the electric power steering device 100, electric power is supplied from a battery 13, and an ignition key signal IG is input via an ignition key 11. The control unit 30 calculates an electric current command value for assist control based on the steering torque Tt detected by the torque sensor 10 and a vehicle speed Vs detected by a vehicle speed sensor 12 to control electric current supplied to the motor 20 by a voltage control command value Vref obtained by compensating for the electric current command value. Note that the steering-wheel angle θr is detected from the steering angle sensor 14 and a motor angle θs is obtained from a rotation sensor connected to the motor 20 (to be described in detail later). Although the steering angle θr is detected from the steering angle sensor 14, it can also be obtained from the rotation sensor connected to the motor 20.

A CAN (Controller Area Network) 40 used to exchange a variety of information on the vehicle is connected to the control unit 30, and the vehicle speed Vs can also be received from the CAN 40. Further, a non-CAN 41 used to exchange any communication other than the CAN 40, analog/digital signals, electric waves, and the like is also connectable to the control unit 30.

Figure 2:
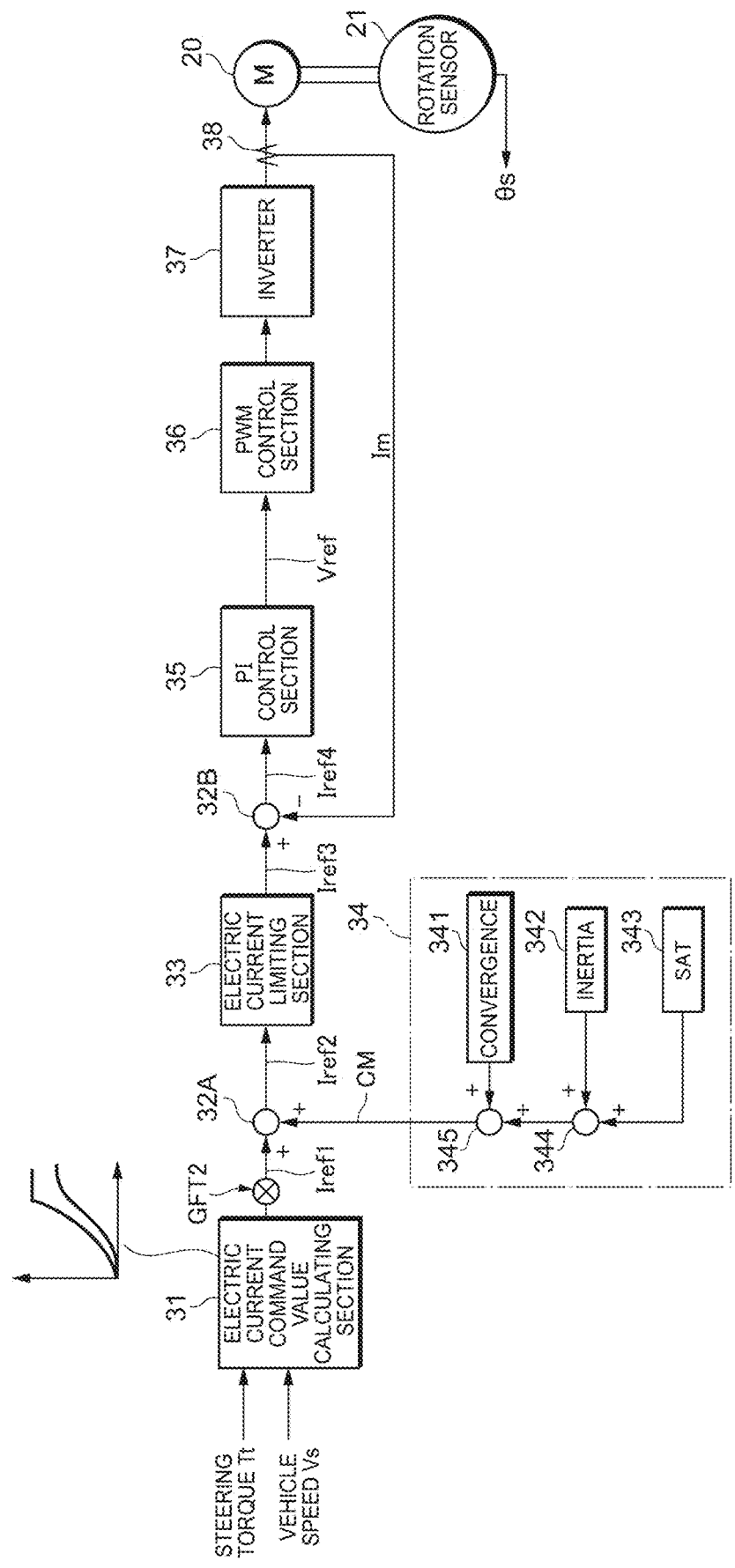
FIG. 2 is a block diagram illustrating a configuration example of a control system of the electric power steering device together with an example of assist map output current.

The control unit 30 is composed mainly of a CPU (including an MPU or an MCU), and typical functions executed by a program inside the CPU are illustrated in FIG. 2.

The functions and operation of the control unit 30 will be described with reference to FIG. 2. The steering torque Tt detected by the torque sensor 10 and the vehicle speed Vs detected by the vehicle speed sensor 12 (or from the CAN 40) are input to an electric current command value calculating section 31 that calculates an electric current command value Iref1. Using an assist map or the like based on the input steering torque Tt and vehicle speed Vs, the electric current command value calculating section 31 calculates the electric current command value Iref1 as a control target value for the electric current supplied to the motor 20.

The assist map is information indicative of a correspondence relationship between steering torques and auxiliary steering command values (electric current values). For example, the assist map includes information indicative of a correspondence relationship between steering torques and auxiliary steering command values in each of low-speed, middle-speed, and high-speed ranges. The information indicative of the correspondence relationship may be represented by plural linear function parameters or expressed by a high-degree polynomials.

The electric current command value Iref1 is input to an electric current limiting section 33 via an addition section 32A, an electric current command value Iref3 with the maximum electric current limited under the overheat protection condition is input to a subtraction section 32B, a deviation Iref4 (=Iref3−Im) from a fed-back motor electric current value Im is calculated, and the deviation Iref4 is input to a PI control section 35 to improve the characteristics of the steering operation. A voltage control command value Vref as a result of improving the characteristics in the PI control section 35 is input to a PWM control section 36, and further the motor 20 is PWM driven through an inverter 37 as a drive section. The electric current value Im of the motor 20 is detected by a motor current detector 38, and fed back to the subtraction section 32B.

Further, a rotation sensor 21 such as a resolver is connected to the motor 20 to detect motor rotation angle θs. A compensation signal CM from a compensation section 34 is added to the addition section 32A, and the addition of the compensation signal CM makes system-based compensation to improve convergence, inertial characteristics, and the like. The compensation section 34 adds self-aligning torque (SAT) 343 and inertia 342 in an addition section 344, and further adds convergence 341 to the addition result in an addition section 345 to set the addition result of the addition section 345 as the compensation signal CM.

In recent years, automatic braking to stop safely and assistance in autonomous driving, which are using cameras, laser radars, or the like mounted in a vehicle, have been made. As the assistance in autonomous driving, for example, the electric power steering device uses a torque sensor to detect a steering torque input by a driver using the steering wheel or any other device, and uses the information for control switching in the vehicle or the electric power steering device to release the assistance in autonomous driving to return to normal assist control (manual steering control).

Figure 3:
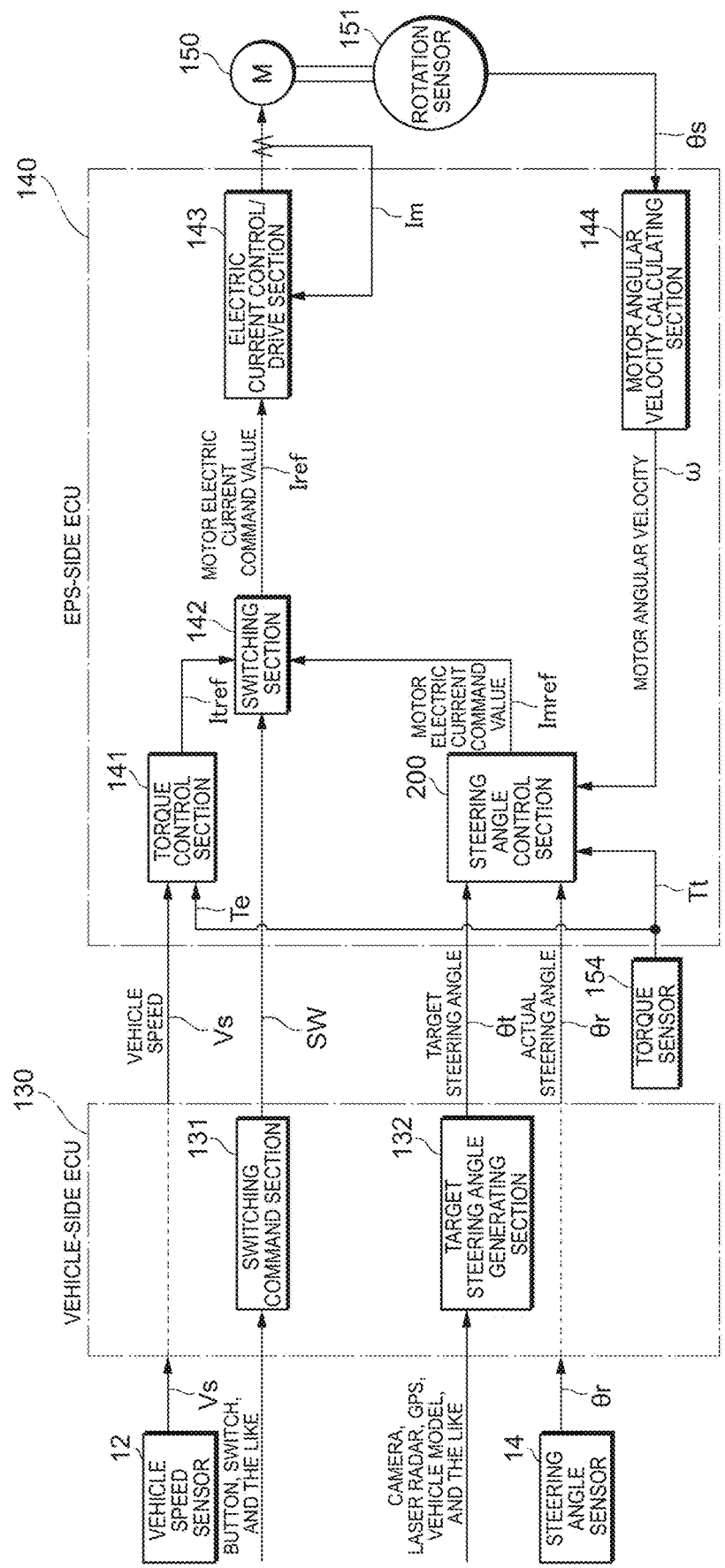
FIG. 3 is a block diagram illustrating an example of an electric power steering device having a switching function between an automatic steering control mode and a manual steering control mode.

Referring first to FIG. 3, a typical electric power steering device 100 as the electric power steering device on which the present invention is premised, i.e., having the functions of an automatic steering control mode and a manual steering control mode, and the function of switching between the steering control modes will be described.

A rotation sensor 151 such as a resolver to detect a motor rotation angle θs is connected to a motor 150 to control the driving of the motor 150 through a vehicle-side ECU 130 and an EPS (electric power steering device) side ECU 140. The vehicle-side ECU 130 includes a switching command section 131 that outputs a switching command SW for automatic steering control or manual steering control based on a button, a switch, or the like indicating the driver's intention, and a target steering angle generating section 132 that generates a target steering angle θt based on signals from cameras (images) or laser radars. Further, the actual steering angle θr detected by the steering angle sensor 14 provided around the column shaft (steering shaft, steering wheel shaft) is input to a steering angle control section 200 inside the EPS-side ECU 140 via the vehicle-side ECU 130.

The switching command section 131 outputs a switching command SW based on a signal that identifies entering automatic steering control, such as a button or a switch provided around a dashboard or the steering wheel to indicate driver's intention, or a vehicle state signal from a parking mode provided in a shift, and inputs the switching command SW to a switching section 142 inside the EPS-side ECU 140. Further, the target steering angle generating section 132 generates the target steering angle θt using a known technique based on data from the cameras (images) or laser radars, and inputs the generated target steering angle θt to the steering angle control section 200 inside the EPS-side ECU 140.

The EPS-side ECU 140 includes a torque control section 141 that outputs a motor electric current command value Itref calculated based on the steering torque Tt and the vehicle speed Vs, the steering angle control section 200 that calculates and outputs a motor electric current command value Imref for steering angle automatic control based on the target steering angle θt, the actual steering angle θr, a motor angular velocity ω, and the steering torque Tt, the switching section 142 that switches between the motor electric current command values Itref and Imref according to the switching command SW, an electric current control/drive section 143 that performs drive control of the motor 150 based on the motor electric current command value Iref (=Itref or Imref) from the switching section 142, and a motor angular velocity calculating section 144 that calculates the motor angular velocity ω based on the motor rotation angle θs from the rotation sensor 151. Based on the switching command SW from the switching command section 131 of the vehicle-side ECU 130, the switching section 142 switches between a torque control mode (manual steering control) by the torque control section 141 and a position and speed control mode (automatic steering control) by the steering angle control section 200 to output the motor electric current command value Itref in the manual steering control or the motor electric current command value Imref in the automatic steering control. The electric current control/drive section 143 is composed of a PI current control section, a PWM control section, an inverter, and the like.

Figure 4:
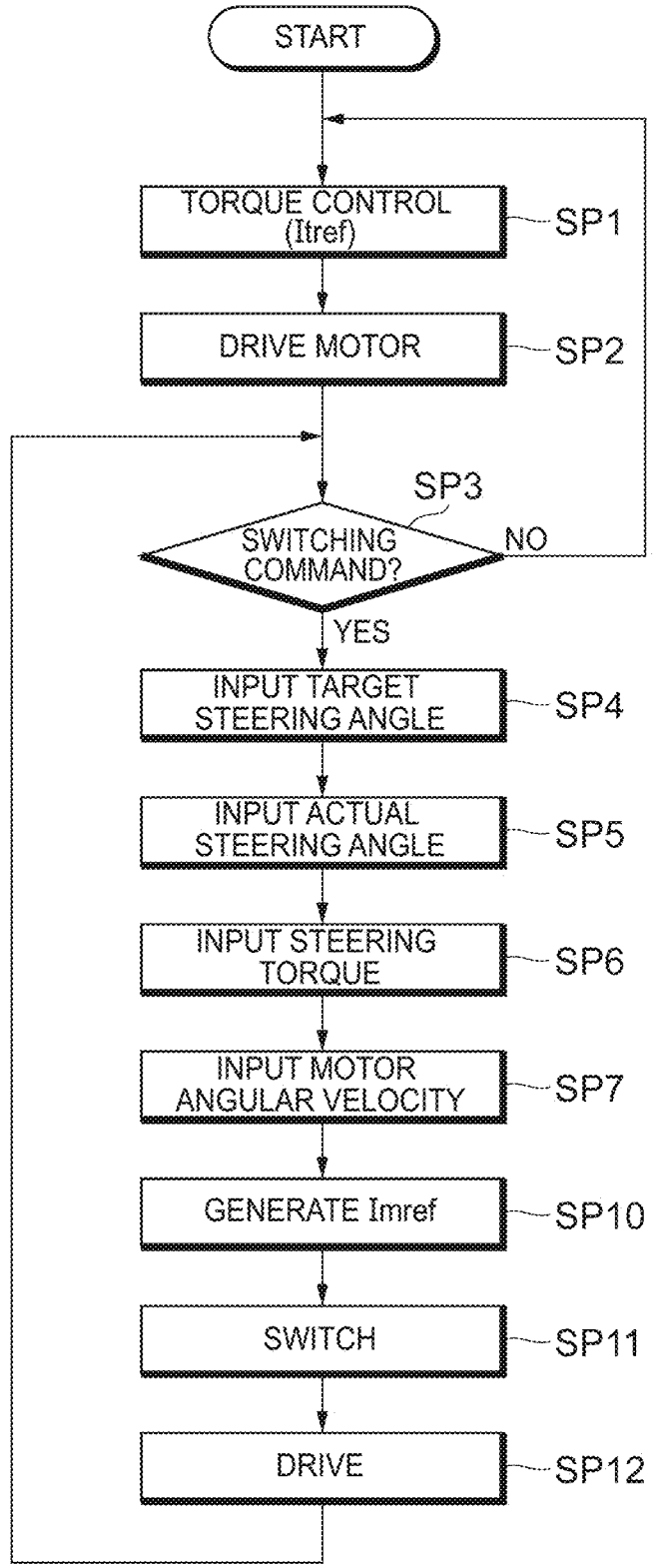
FIG. 4 is a flowchart illustrating a general operation example of the electric power steering device having the switching function between the automatic steering control mode and the manual steering control mode.

A schematic operation example in such a configuration will be described with reference to a flowchart (see FIG. 4).

When the operation of the steering system is started, torque control (manual steering control mode) by the torque control section 141 is first performed (step SP1), and the motor 150 is driven by the electric current control/drive section 143 using the motor electric current command value Itref (step SP2). The above manual steering operation is repeated until a switching command SW to automatic steering control is output from the switching command section 131 (step SP3).

When the mode becomes the automatic steering control mode and the switching command SW is output from the switching command section 131, the target steering angle θt is input from the target steering angle generating section 132 (step SP4), the actual steering angle θr is input from the steering angle sensor 14 (step SP5), the steering torque Tt is input from the torque sensor 154 (step SP6), the motor angular velocity ω is input from the motor angular velocity calculating section 144 (step SP7), and the motor electric current command value Imref is generated in the steering angle control section 200 (step SP10). Note that the order of inputting the target steering angle θt, the actual steering angle θr, the steering torque Tt, and the motor angular velocity ω can be changed arbitrarily.

After that, the switching section 142 performs switching based on the switching command SW from the switching command section 131 (step SP11) to have the electric current control/drive section 143 drive the motor 150 using the motor electric current command value Imref from the steering angle control section 200 (step SP12), and return to step SP3 mentioned above. The drive control (automatic steering control) by the motor electric current command value Imref is repeated until the switching command SW from the switching command section 131 is changed.

In the embodiment, when a steering wheel operation (steering) by a driver intervenes during autonomous driving in a vehicle provided with the electric power steering device 100 having such a general structure as described above, the intervention operation is fully reflected and a feeling of strangeness and a feeling of discomfort given to the driver when the operation intervenes are reduced, where when no abnormality occurs in the steering angle sensor 14, the steering angle sensor 14 is used to perform steering angle control, while when any abnormality is detected in the steering angle sensor 14, an estimate of a steering angle is determined instead of using the steering angle sensor 14 to perform steering angle control using the determined estimate of the steering angle. Each component in the electric power steering device 100 of the embodiment will be described below (see FIG. 5, and the like).

Figure 5:
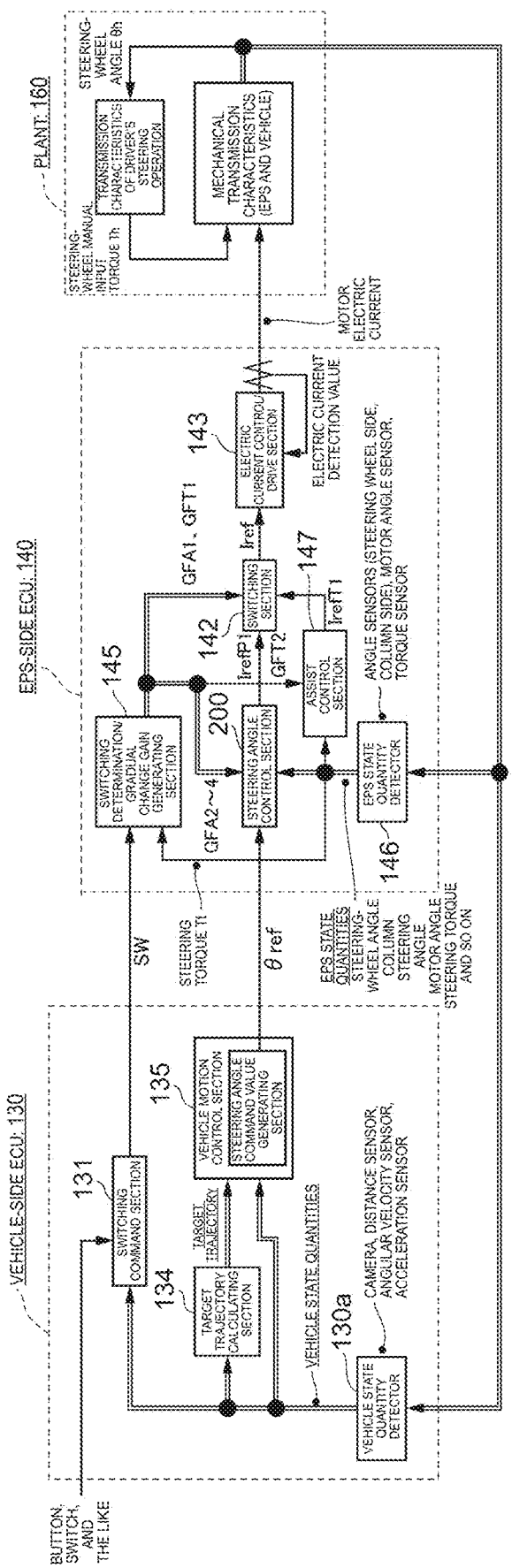
FIG. 5 is a block diagram illustrating a configuration example of the entire vehicle system.

The configurations of the vehicle-side ECU 130, the EPS-side ECU 140, and a plant 160 related to the electric power steering device 100 of the embodiment are illustrated (see FIG. 5). Note that the double line in FIG. 5 means that plural signals are transmitted or received.

The vehicle-side ECU 130 includes a vehicle state quantity detector 130a, the switching command section 131, a target trajectory calculating section 134, and a vehicle motion control section 135.

The vehicle state quantity detector 130a detects vehicle state quantities based on respective data detected by a camera, a distance sensor, an angular velocity sensor, an acceleration sensor, and the like mounted in the vehicle, and transmits the vehicle state quantities to the switching command section 131, the target trajectory calculating section 134, and the vehicle motion control section 135.

The switching command section 131 outputs the switching command SW to the EPS-side ECU 140 (to a switching determination/gradual change gain generating section 145 thereof) based on the above-mentioned vehicle state quantities, and signals from buttons and switches.

The target trajectory calculating section 134 calculates target trajectory data based on the vehicle state quantities, and outputs the target trajectory data to the vehicle motion control section 135.

The vehicle motion control section 135 has a steering angle command value generating section 135a generate a steering angle command value θref based on the vehicle state quantities, and outputs the steering angle command value θref to the steering angle control section 200 of the EPS-side ECU 140.

The EPS-side ECU 140 includes the switching section 142, the electric current control/drive section 143, the switching determination/gradual change gain generating section 145, an EPS state quantity detector 146, an assist control section 147, and the steering angle control section 200 (see FIG. 5).

The EPS state quantity detector 146 detects EPS state quantities based on a steering-wheel angle θh output from the plant 160, and further various data detected by angle sensors (steering wheel side, column side), a motor angle sensor, a torque sensor, and the like mounted in the vehicle. The EPS state quantities (steering-wheel angle θh, column steering angle (steering angle on the lower side of the torsion bar), steering-wheel angle (steering angle on the upper side of the torsion bar), motor angle, steering torque, and so on) detected by the EPS state quantity detector 146 are output to the switching determination/gradual change gain generating section 145 and the assist control section 147, respectively. In the vehicle system illustrated in FIG. 5, the steering-wheel angle θh is detected in the EPS-side ECU 140, but the steering-wheel angle θh may be detected on the side of the vehicle-side ECU 130 instead.

The switching determination/gradual change gain generating section 145 makes a switching determination based on the switching command SW (between assist control and steering angle control) from the switching command section 131 of the vehicle-side ECU 130, and the steering torque Tt, and manages and outputs each gradual change gain to each function. The switching determination/gradual change gain generating section 145 in the embodiment outputs, to the steering angle control section 200, a speed control gradual change gain GFA2, a speed command gradual change gain GFA3, and a steering angle command gradual change gain GFA4, outputs, to the assist control section 147, an assist map gradual change gain GFT2, and outputs, to the switching section 142, a steering angle control output gradual change gain GFA1 and an assist control output gradual change gain GFT1.

The assist control section 147 outputs a steering angle control electric current command value IrefP1 to the switching section 142 based on the steering torque Tt and the assist map gradual change gain GFT2.

The steering angle control section 200 calculates a steering angle control electric current command value IrefP1 based on the steering angle command value θref, the speed control gradual change gain GFA2, the speed command gradual change gain GFA3, the steering angle command gradual change gain GFA4, and the EPS state quantities, and outputs the steering angle control electric current command value IrefP1 to the switching section 142. The switching section 142 switches between the steering angle control electric current command value IrefP1 from the steering angle control section 200 and the electric current command value IrefT1 from the assist control section 147 according to the steering angle control output gradual change gain GFA1 and the assist control output gradual change gain GFT1 from the switching determination/gradual change gain generating section 145. The electric current control/drive section 143 performs feedback control to make the electric current detection value follow the motor electric current command value Iref. Thus, the driving torque of the motor 150 can be controlled. The electric current control/drive section 143 may have a structure for a widely used motor control system.

The plant 160 has or shows mechanical transmission characteristics (related to EPS and vehicle) that follow a motor drive control signal (motor electric current) from the electric current control/drive section 143, and the driver's steering transmission characteristics that follow manual steering input by the driver (see FIG. 5). The term "plant" in this specification is a term that collectively calls control targets, such as the mechanical characteristics of the vehicle and the electric power steering device 100, the driver's characteristics, and the like.

Then, the outline of the steering angle control section 200 in the EPS-side ECU 140, which is featured in the embodiment, and respective components thereof will be described (see FIG. 6).

A. First Configuration of Steering Angle Control Section 200

<Steering Angle Calculating Section 201>

A steering angle calculating section 201 determines an actual steering angle θr or an estimate θr of the actual steering angle using a steering-wheel angle θh output from the steering angle sensor 14, a motor angle θm output from the rotation sensor 151, a steering torque Tt output from the torque sensor 154, and a steering angle abnormality determination signal Flg_θh output from a steering angle abnormality determining section 148 in the steering angle control mode. Specifically, when it is determined that a detected steering angle (steering-wheel angle in the embodiment) is normal based on the steering angle abnormality determination signal Flg_θh, the steering angle calculating section 201 outputs the steering-wheel angle θh as the actual steering angle θr. On the other hand, when it is determined that the detected steering angle is abnormal based on the steering angle abnormality determination signal Flg_θh, the steering angle calculating section 201 outputs an estimate θr of the actual steering angle using a past value Zθr of the actual steering angle under normal conditions, a motor relative angle Δθm, and a relative twist angle Δθ of the torsion bar. Thus, even when a steering angle abnormality occurs in the steering-wheel angle in the steering angle control mode, since the actual steering angle can be estimated accurately, the occurrence of an accident and the like can be prevented without causing any problem with the behavior of the vehicle/EPS during autonomous driving. Further, the occurrence of steering angle abnormality does not cause the driver to feel strange. Note that the steering angle abnormality determination signal Flg_θh is a determination signal output, for example, from a steering angle abnormality determining section (not illustrated) in the ESP-side ECU 140. When the steering-wheel angle θh falls within a normal range, the steering angle abnormality determining section outputs, to the steering angle calculating section 201, a steering angle abnormality determination signal Flg_θh indicative of being normal, while when the steering-wheel angle θh is out of the normal range, the steering angle abnormality determining section outputs, to the steering angle calculating section 201, a steering angle abnormality determination signal Flg_θh indicative of being abnormal.

<Upper and Lower Limit Variable Limiter 202>

An upper and lower limit variable limiter (also called a steering angle command value upper and lower limit variable limiter) 202 is used to impose a limitation on the steering angle command value θref for autonomous driving or the like received from the vehicle-side ECU 130 in order to prevent an abnormal value or an excess value due to a communication error or the like from being input for steering angle control. With the switching operation between steering angle control and assist control, the upper and lower limiter values are made variable to be appropriate values sequentially according to the steering angle command gradual change gain GFA4.

<Variable Rate Limiter 204>

A variable rate limiter 204 performs rate limit processing on the steering angle command value θref to avoid an abrupt change in steering angle control electric current command value as the steering angle control output due to an abrupt change in the steering angle command value θref. Such processing performed by the variable rate limiter 204 also leads to improving the safety of the driver from quick behavior of the steering wheel. In the variable rate limiter 204 of the embodiment, the rate limiter value is made variable to be an appropriate value sequentially according to the steering angle command gradual change gain GFA4 along with the switching operation between steering angle control and assist control.

<Steering-Wheel Vibration Removing Means 206>

When the steering angle command is changing during autonomous driving, a frequency (around about 10 Hz) component is generated in the steering angle command value θref3 to excite vibration induced by the spring properties of the torsion bar and the inertia moment of the steering wheel. The vibrational frequency component can be reduced by the steering angle command value upper and lower limit variable limiter 202, the variable rate limiter 204, and a low-pass filter and a notch filter (these filters are used in steering-wheel vibration removing means 206) that reduce the steering-wheel vibrational frequency component included in the steering angle command value θref3 after being subjected to steering angle command gradual change, or by phase-lag compensation.

<Position Control Section 208>

A position control section 208 multiplies a deviation between a target steering angle θt and an actual steering angle θr or an actual steering angle (estimate) θr by a proportional gain to calculate a steering angular velocity command value ωref. This function can lead to generating a steering angular velocity command value used to approximate the actual steering angle θr or the actual steering angle (estimate) θr to the target steering angle θt. Note that the term "position control" in this specification means the control of a steering angle position in the circumferential direction, i.e., it can also be expressed as "angle control of the steering-wheel angle."

<Speed Command Value Upper and Lower Limit Variable Limiter 210>

Processing by a speed command value upper and lower limit variable limiter 210 is performed on a steering angular velocity command value ωref1 after being multiplied by a gradual change gain to output the target steering angular velocity ωt. This speed command value upper and lower limit variable limiter 210 can change the limit values sequentially to appropriate values according to the speed command gradual change gain GFA3 to limit the steering angular velocity command value in such a manner that the upper and lower limiter values are made smaller when the gradual change gain GFA3 is less than a certain threshold value, and made larger when the gradual change gain GFA3 is equal to or larger than the threshold value.

<Steering Angular Velocity Control Section 212>

In the steering angle control section 200 of the embodiment, the target steering angular velocity ωt and the actual steering angular velocity ωr are input to a steering angular velocity control section 212 to calculate an electric current command value so as to make the actual steering angular velocity ωr follow the target steering angular velocity ωt. Here, the actual steering angular velocity ωr is calculated by performing an arithmetic operation typically used in an actual steering angular velocity calculating section, not illustrated. Specifically, for example, the actual steering angular velocity may be calculated from a difference operation of the motor angle sensor and a gear ratio, or the actual steering angular velocity may be calculated from a difference operation of the steering-wheel angle or the column steering angle. An unillustrated LPF (low-pass filter) is inserted at the final stage of the arithmetic system to reduce high-frequency noise.

<Steering Angle Control Output Upper and Lower Limit Limiter 214>

A steering angle control output upper and lower limit limiter 214 is used to impose a limitation on the electric current command value for steering angle control in order to prevent excessive output.

<Steering Intervention Compensating and Steering-Wheel Vibration Suppressing Means 220>

Steering intervention compensating and steering-wheel vibration suppressing means 220 functions as steering-wheel vibration suppressing means based on a torque signal detected by the torque sensor. According to this function, the steering wheel vibration suppressing effect during automatic steering is further improved compared with the case of using only the steering-wheel vibration removing means 206. The steering intervention compensating and steering-wheel vibration suppressing means 220 of the embodiment implements a steering-wheel vibration suppressing function using gain and phase compensation. For example, the phase compensation may be configured using a primary filter. Thus, the electric current command value is output in a direction to release a twist of the torsion bar. The steering intervention compensating and steering-wheel vibration suppressing means 220 works in a direction to reduce the angle of twist, which also has the effect of reducing the feeling of strangeness of getting caught upon steering intervention of manual input by the driver.

<FF Filter 230>

An FF (feedforward) filter 230 is an optional component configurable in the position control section 208 (see an embodiment to be described later and illustrated in FIG. 8 and the like). According to the FF filter 230, the performance to follow the target steering angle $\theta t$ is improved. The FF filter 230 has an effect, for example, as a primary phase-lead filter, but it may make any phase compensation other than that, or may use a pseudo-differential or an HPF (high-pass filter).

Here, various gradual change gains in the embodiment will be described below (see FIG. 5 and FIG. 6).

<Steering Angle Control Output Gradual Change Gain GFA1>

The electric current command value as output of the steering angle control output upper and lower limit limiter 214 is multiplied by the steering angle control output gradual change gain GFA1. The steering angle control output gradual change gain GFA1 is used for smooth switching operation between assist control and steering angle control to reduce the feeling of strangeness given to the driver, and realize the safety, and the like.

<Speed Control Gradual Change Gain GFA2>

The signal in the steering angular velocity control section 212 is multiplied by the speed control gradual change gain GFA2, and the speed control gradual change gain GFA2 is used to realize smooth switching. The speed control gradual change gain GFA2 is mainly used to relax the impact of the accumulation of integral values in steering angular velocity control upon switching.

<Speed Command Gradual Change Gain GFA3>

The speed command gradual change gain GFA3 is mainly used to realize smooth switching from assist control to steering angle control. The steering angular velocity command value $\omega ref$ as position control output is multiplied by the speed command gradual change gain GFA3.

<Steering Angle Command Gradual Change Gain GFA4>

The steering angle command value from the variable rate limiter 204 is multiplied by the steering angle command gradual change gain GFA4.

<Assist Control Output Gradual Change Gain GFT1>

The electric current command value as output from the assist control section 147 is multiplied by the assist control output gradual change gain GFT1. The assist control output gradual change gain GFT1 is used for smooth switching operation between steering angle control and assist control and to realize driver's steering intervention during autonomous driving.

<Assist Map Gradual Change Gain GFT2>

Assist map output current in assist control (see a graph in FIG. 2 as an example of the assist map output current (where the ordinate is electric current command value and the abscissa is steering torque Tt)) is multiplied by the assist map gradual change gain GFT2. The assist map gradual change gain GFT2 is used for smooth switching operation between steering angle control and assist control and to realize driver's steering intervention during autonomous driving.

A-1. Arithmetic Processing by Steering Angle Calculating Section 201

Figure 7:
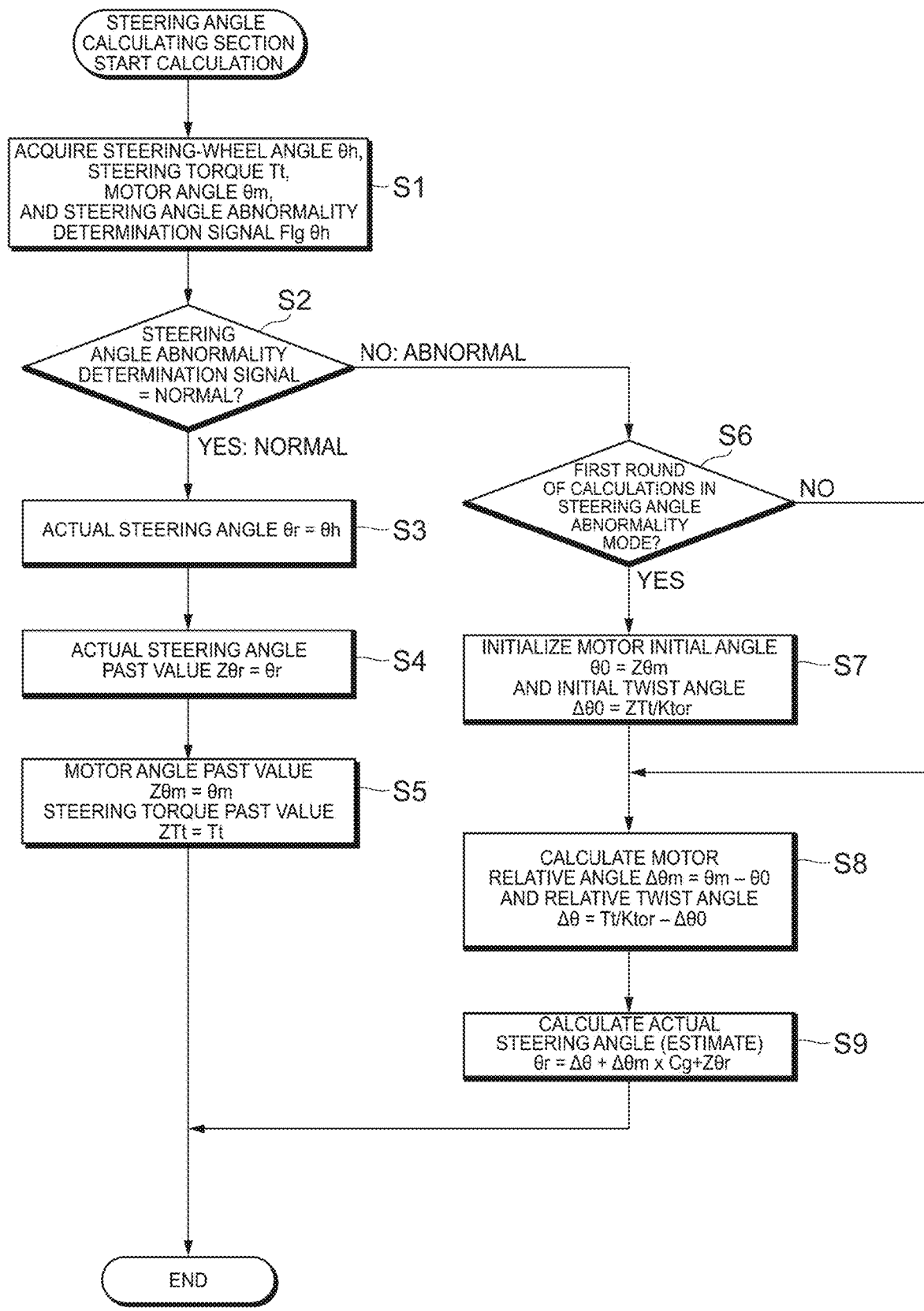
FIG. 7 is a flowchart illustrating arithmetic processing by a steering angle calculating section.

Arithmetic processing (first arithmetic processing) performed by the steering angle calculating section 201 will next be described with reference to a flowchart illustrated in FIG. 7.

In the steering angle control mode, the steering angle calculating section 201 acquires a steering-wheel angle $\theta h$ output from the steering angle sensor 14, a motor angle $\theta m$ output from the rotation sensor 151, a steering torque Tt output from the torque sensor 154, and a steering angle abnormality determination signal Flg_$\theta h$ output from the steering angle abnormality determining section 148 (step S1). Based on the steering angle abnormality determination signal Flg_$\theta h$, the steering angle calculating section 201 determines whether the detected steering angle is normal or not (step S2). When determining that the detected steering angle is normal (step S2; YES), the steering angle calculating section 201 proceeds to step S3 to output the steering-wheel angle $\theta h$ as the actual steering angle $\theta r$. Then, the steering angle calculating section 201 stores, in a memory (not illustrated), the actual steering angle $\theta r$, the motor angle $\theta m$, and the steering torque Tt determined this time, respectively as a past value Z$\theta r$ of the actual steering angle, a past value Z$\theta m$ of the motor angle, and a past value ZTt of the steering torque (step S3→step S4→step S5), and ends the processing.

On the other hand, when determining in step S2 that the detected steering angle is abnormal (step S2; NO), the steering angle calculating section 201 proceeds to step S6 to determine whether it has been the first calculation after the steering angle abnormality was detected (i.e., the first round of calculations). When determining that it has not been the first round of calculations after the steering angle abnormality was detected (step S6; NO), the steering angle calculating section 201 skips step S7 and proceeds to step S8. On the other hand, when determining that it has been the first round of calculations after the steering angle abnormality was detected (step S6; YES), the steering angle calculating section 201 uses the past value Z$\theta m$ of the motor angle and the past value ZTt of the steering torque to determine a motor initial angle $\theta 0$ (=Z$\theta m$) and an initial twist angle $\Delta\theta 0$ of the torsion bar (=ZTt/Ktor; Ktor denotes a torsion bar spring constant) (step S7). Then, the steering angle calculating section 201 subtracts the motor initial angle $\theta 0$ from the present motor angle $\theta m$ to determine a motor relative angle $\Delta\theta m$, and subtracts the initial twist angle $\Delta\theta 0$ of the torsion bar from the present twist angle Tt/Ktor of the torsion bar to determine a relative twist angle $\Delta\theta$ of the torsion bar (step S8). Further, the steering angle calculating section 201 multiplies the motor relative angle $\Delta\theta m$ by a predetermined coefficient Cg (the inverse of a reduction ratio between the column shaft and the motor shaft) and adds the relative twist angle $\Delta\theta$ of the torsion bar and the past value Z$\theta r$ of the actual steering angle to determine an estimate $\theta r$ of the actual steering angle (step S9) and ends the processing.

B. Second Configuration of Steering Angle Control Section 200

Figure 6:
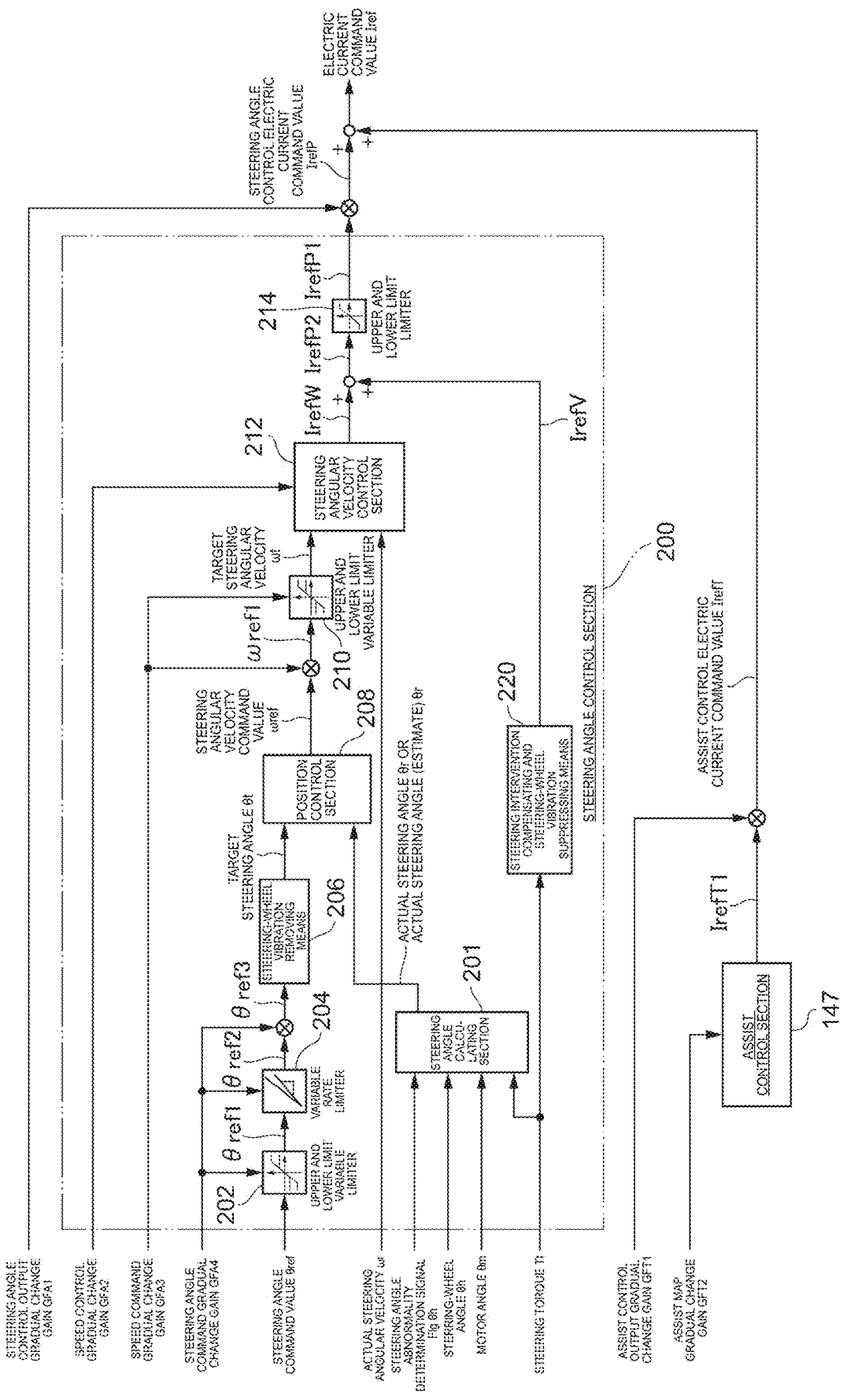
FIG. 6 is a block diagram illustrating a first configuration of a steering angle control section in an EPS-side ECU.
Figure 8:
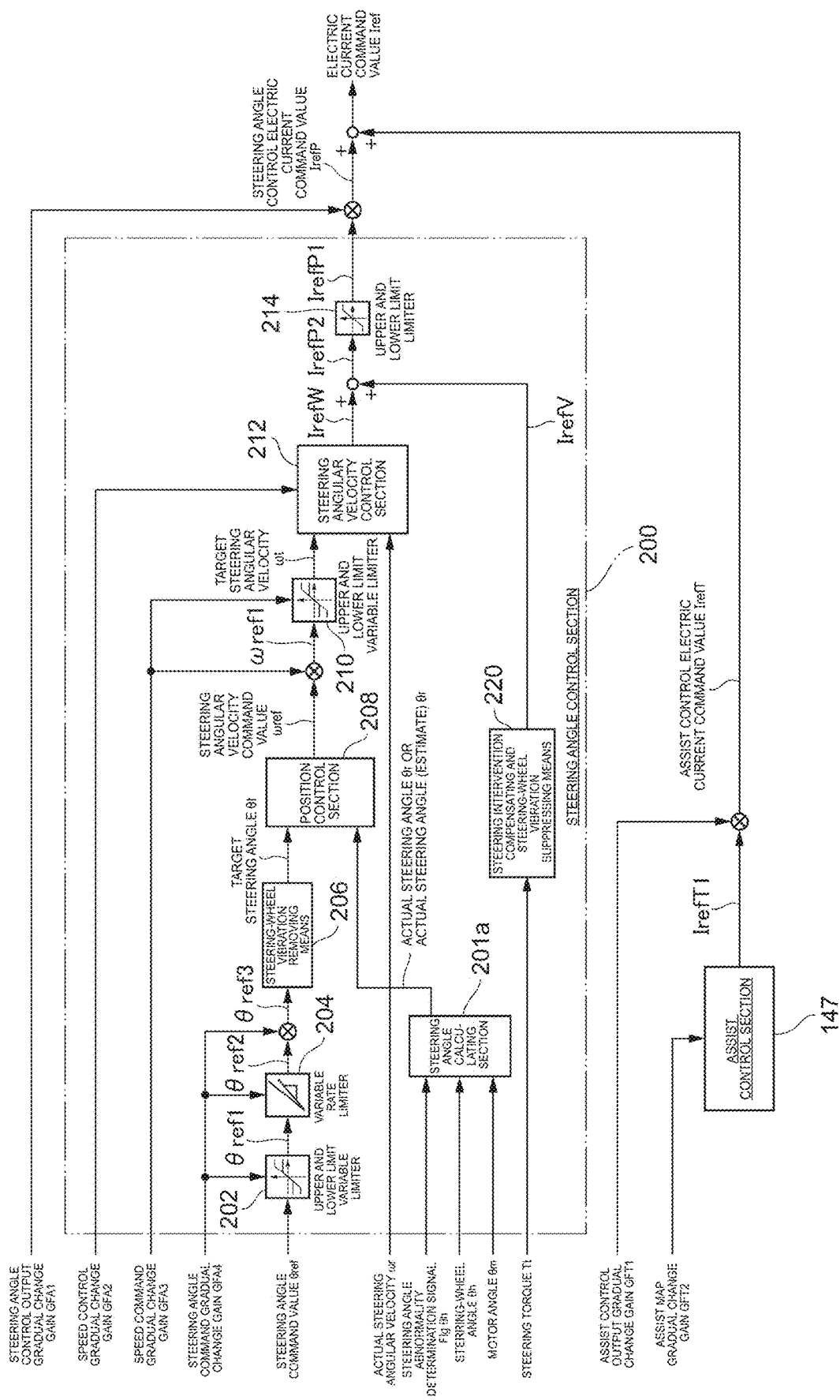
FIG. 8 is a block diagram illustrating a second configuration of the steering angle control section in the EPS-side ECU.

FIG. 8 is a diagram illustrating a second configuration of the steering angle control section 200 in the EPS-side ECU 140, which corresponds to FIG. 6 mentioned above. Note that since components other than a steering angle calculating section 201a are the same as those in FIG. 6 mentioned above, corresponding components are given the same reference numerals to omit redundant detailed description.

<Steering Angle Calculating Section 201a>

A different point from the steering angle calculating section 201 illustrated in FIG. 6 is as follows: In the steering angle control mode, the steering angle calculating section 201a uses the steering-wheel angle θh output from the steering angle sensor 14, the motor angle θm output from the rotation sensor 151, and the steering angle abnormality determination signal Flg_θh output from the steering angle abnormality determining section 148 without using the steering torque Tt to determine the actual steering angle θr or the estimate θr of the actual steering angle. Thus, when the steering torque Tt is not used, the actual steering angle θr or the estimate θr of the actual steering angle can be determined more easily.

B-1. Arithmetic Processing by Steering Angle Calculating Section 201a

Figure 9:
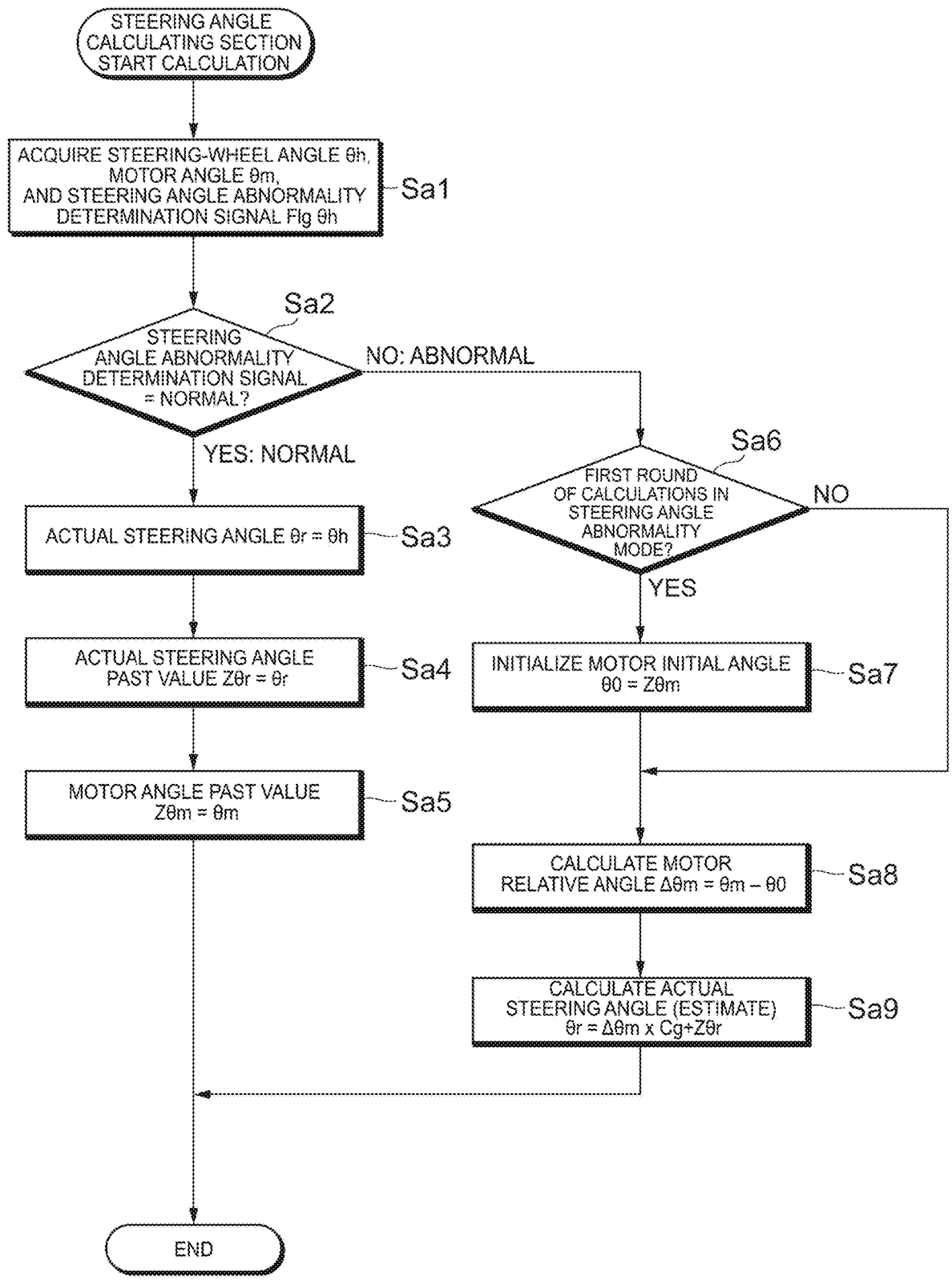
FIG. 9 is a flowchart illustrating arithmetic processing by the steering angle calculating section.

Arithmetic processing (second arithmetic processing) performed by the steering angle calculating section 201a will next be described with reference to a flowchart illustrated in FIG. 9.

In the steering angle control mode, the steering angle calculating section 201a acquires the steering-wheel angle θh output from the steering angle sensor 14, the motor angle θm output from the rotation sensor 151, and the steering angle abnormality determination signal Flg_θh output from the steering angle abnormality determining section 148 (step Sa1). Based on the steering angle abnormality determination signal Flg_θh, the steering angle calculating section 201 determines whether the detected steering angle is normal or not (step Sa2). When determining that the detected steering angle is normal (step Sa2; YES), the steering angle calculating section 201 proceeds to step Sa3 to output the steering-wheel angle θh as the actual steering angle θr. Then, the steering angle calculating section 201 stores, in a memory (not illustrated), the actual steering angle θr and the motor angle θm determined this time, respectively as the past value Zθr of the actual steering angle and the past value Zθm of the motor angle (step Sa3→step Sa4→step Sa5), and ends the processing.

On the other hand, when determining in step Sa2 that the detected steering angle is abnormal (step Sa2; NO), the steering angle calculating section 201 proceeds to step Sa6 to determine whether it has been the first calculation after the steering angle abnormality was detected (i.e., the first round of calculations). When determining that it has not been the first round of calculations after the steering angle abnormality was detected (step Sa6; NO), the steering angle calculating section 201 skips step Sa7 and proceeds to step Sa8. On the other hand, when determining that it has been the first round of calculations after the steering angle abnormality was detected (step Sa6; YES), the steering angle calculating section 201 uses the past value Zθm of the motor angle to determine a motor initial angle θ0 (=Zθm) (step Sa7). Then, the steering angle calculating section 201 subtracts the motor initial angle θ0 from the present motor angle θm to determine a motor relative angle Δθm (step Sa8). Further, the steering angle calculating section 201 multiplies the motor relative angle Δθm by a predetermined coefficient Cg (the inverse of a reduction ratio between the column shaft and the motor shaft) and adds the past value Zθr of the actual steering angle to determine an estimate θr of the actual steering angle (step Sa9) and ends the processing.

<Simulation Results>

Figure 10A:
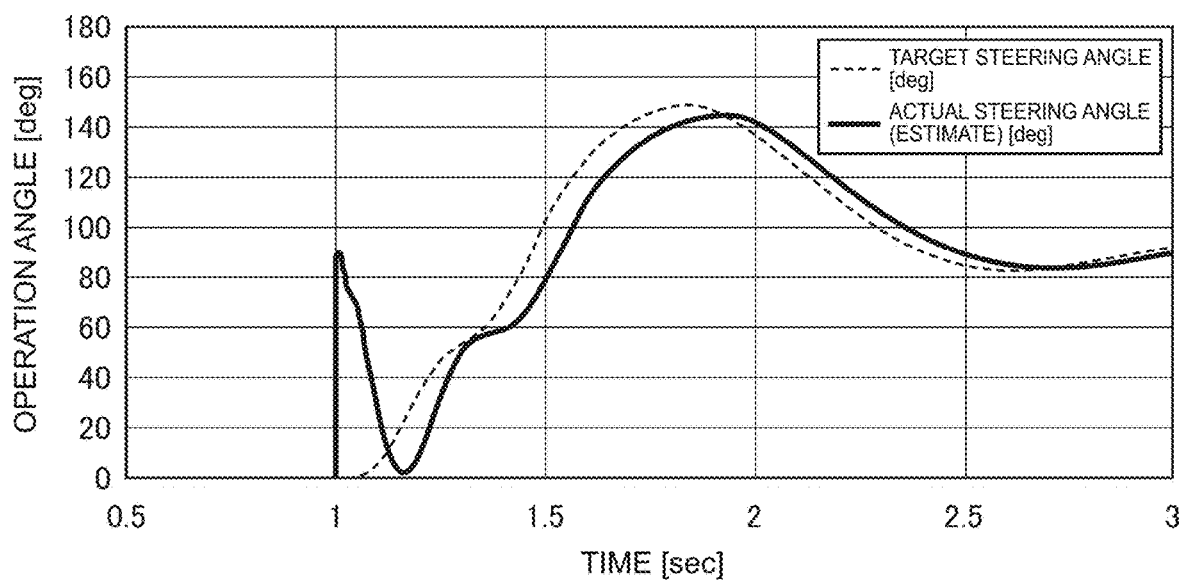
FIG. 10A is a chart illustrating the simulation results of the vehicle behavior.
Figure 10B:
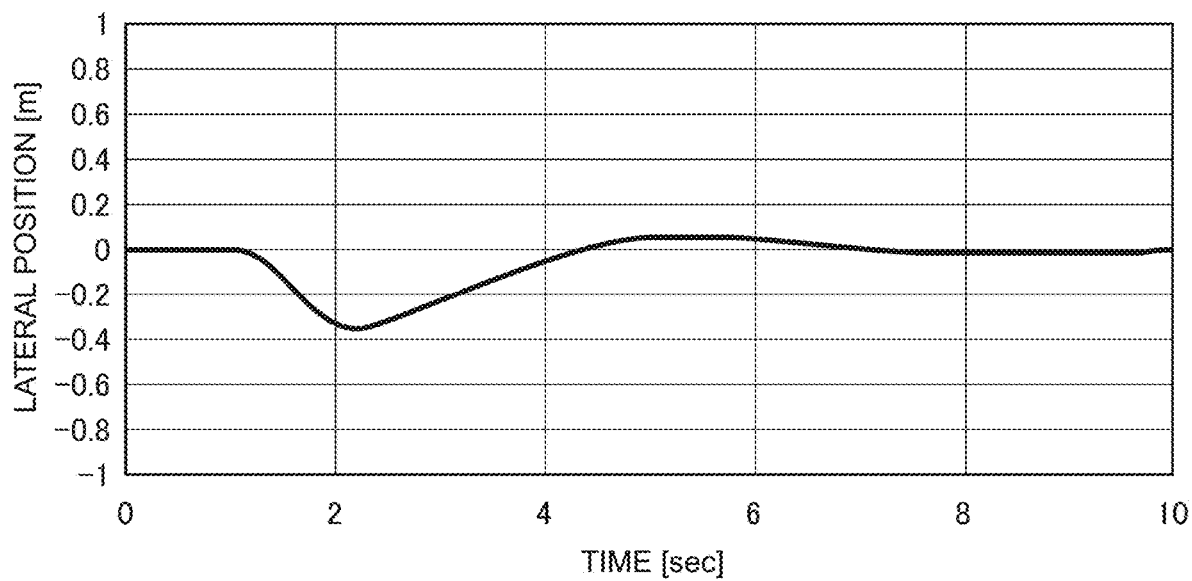
FIG. 10B is a chart illustrating the simulation results of the vehicle behavior.

FIG. 10A and FIG. 10B illustrate the simulation results of the vehicle behavior when an offset value of 1 [sec]+90 [deg] is deliberately added to the actual steering angle or the actual steering angle (estimate). In the steering angle command value generating section (see FIG. 5) of the vehicle-side ECU 130, PI-D control was applied to the lateral position of the vehicle on condition that the target value of the lateral position was 0 [m], and the steering angle command value θref was output to the steering angle control section 200 (see FIG. 5) in the EPS-side ECU 140. In this case, it is found that the lateral position converges on the target 0[m] (see FIG. 10B). It is considered that this is because the proportional and integral compensation of the PI-D control demonstrates an effect. Although not illustrated, an offset occurs in the lateral position even without the integral. However, this problem can be solved by setting the proportional gain larger.

C. Transition to Assist Control After Manual Input Determination

Here, a transition to assist control after the manual input determination will be described (see FIG. 11). Each gradual change gain after the detection of driver's manual input in an autonomous driving state (a state in which both steering angle control and assist control intervene) will be described below.

The gradual change gains GFA1 to 4 (the steering angle control output gradual change gain GFA1, the speed control gradual change gain GFA2, the speed command gradual change gain GFA3, and the steering angle command gradual change gain GFA4) sequentially decrease from 100% after the manual input determination, and is linearly changed to make a transition to 0% in the embodiment. In order to make the switching operation further smooth, the transition may be made along an S-shaped curve, or by setting a value for a linearly changing signal passing through an LPF (low-pass filter) as each gradual change gain (for example, primary LPF, cut-off frequency 2 [Hz]). Note that the gradual change gains GFA1 to 4 are not required to work with one another as the same transition, and these gradual change gains may make independent transitions as control factors.

(Steering Angle Command Gradual Change Gain GFA4)

The change rate set value of the variable rate limiter for the steering angle command value is set to 0. In other words, θref2 is set to a constant value. Though the illustration of this in a flowchart and the like is omitted, this can be realized by changing the change rate set value when the steering angle command gradual change gain GFA4 changes from the state of 100% to 0% side. In other words, θref2 is set to the constant value upon entering the switching state, and the constant value is multiplied by the steering angle command gradual change gain GFA4 to make θref3 and the target steering angle θt approximate to 0. Further, the target steering angle θt during switching is made approximate to 0 [deg] by multiplying θref2 by the steering angle command gradual change gain GFA4 to make steering angle control work in a neutral state. Further, the steering angle command gradual change gain GFA4 is multiplied before the steering-wheel vibration removing means 206 to remove the steering-wheel vibrational frequency component generated by the multiplication of the steering angle command gradual change gain GFA4.

(Assist Map Gradual Change Gain GFT2)

Figure 11:
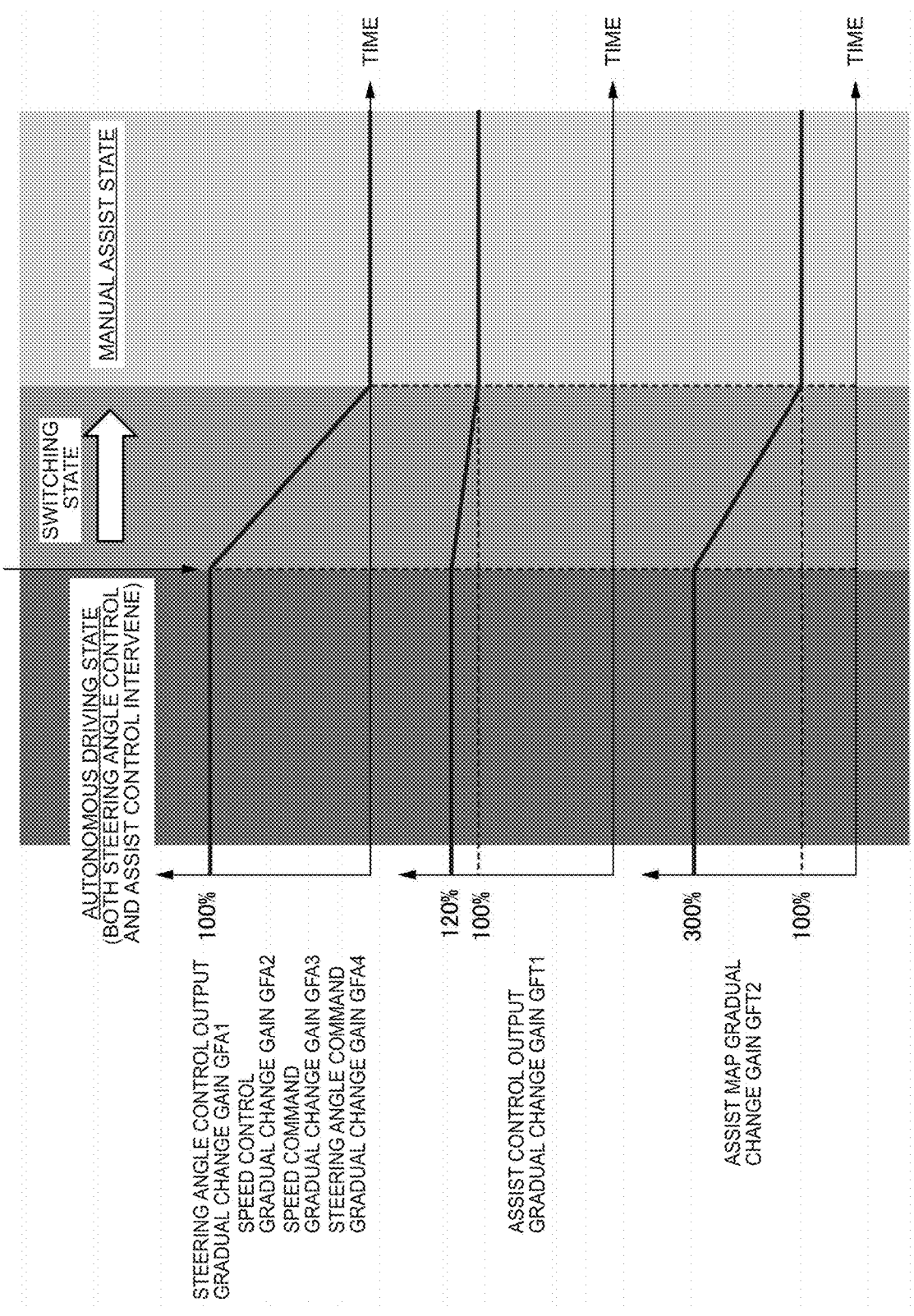
FIG. 11 is a graph for describing a transition of each gradual change gain to assist control after the manual input determination.

In the autonomous driving state of the vehicle, this assist map gradual change gain GFT2 may be set over 100% (set to 300% in the example illustrated in FIG. 11). This can reduce the sense of getting caught due to the interference of steering angle control and the feeling of strangeness at the time of a driver's operation intervention. In order to make the switching operation further smooth, the transitions of the assist control output gradual change gain GFT1 and the assist map gradual change gain GFT2 may be made along S-shaped curves, or by setting a value for a linearly changing signal passing through an LPF (low-pass filter) as each gradual change gain.

(Assist Control Output Gradual Change Gain GFT1)

In the autonomous driving state and the manual assist state, this assist control output gradual change gain GFT1 may be always set over 100%, or may be set as illustrated in FIG. 11.

In the autonomous driving state, when the assist map gradual change gain GFT2 rises over 100%, the stability of the system may be affected to be instable and hence vibration may be generated. In order to ensure stability, the assist control output gradual change gain GFT1 can be set, for example, to 120% as a control factor to suppress the generation of vibration.

Figure 12:
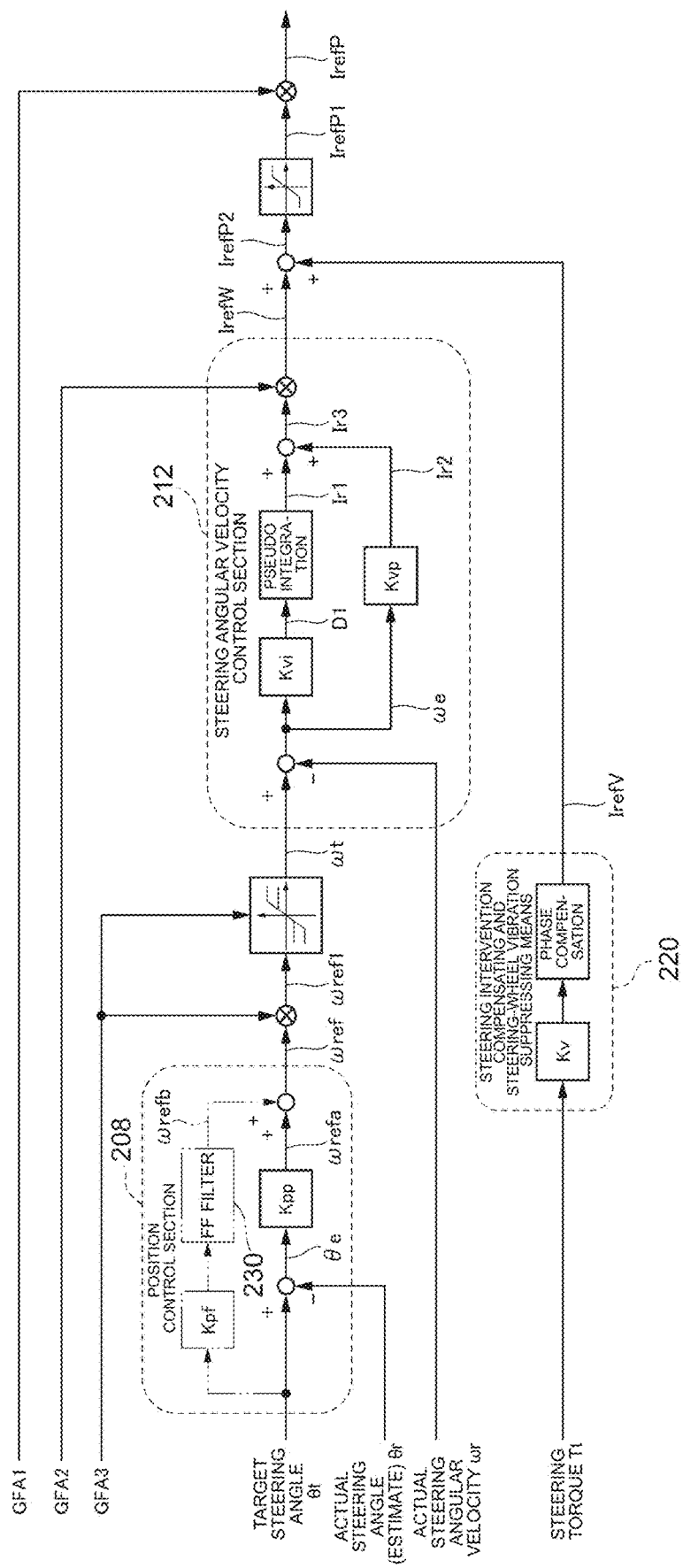
FIG. 12 is a block diagram of the steering angle control section to illustrate a first form of steering angle control.

Then, forms of steering angle control will be illustrated (see FIG. 12, and so on). Note that FIG. 12, and so on illustrate the target steering angle θt at the subsequent stage of the steering-wheel vibration removing means 206 (see FIG. 6) and the configuration of components that follow.

<First Form of Steering Angle Control>

The steering angular velocity control section 212 of the steering angle control section 200 illustrated in FIG. 12 performs PI control in steering angular velocity control, and performs a pseudo-integration in I control. More specifically, a deviation ωe between the target steering angular velocity ωt and the actual steering angular velocity ωr is multiplied by Kvi to set an operation amount D1 proportional to the magnitude of the deviation, and further I control using the pseudo-integration is performed (see FIG. 12). Reference sins in the drawings are as follows: Ir1 indicates a signal after the pseudo-integration, Ir2 indicates a signal after proportional gain Kvp, and Ir3 indicates a signal after addition, respectively (the same applies to the other forms). In the first form of steering angle control, the signal Ir3 after the addition is multiplied by the speed control gradual change gain GFA2, and output as a signal IrefW from the steering angular velocity control section 212. As described above, a signal in the steering angular velocity control section 212 is multiplied by the speed control gradual change gain GFA2, and used to realize smooth switching. Note that the pseudo-integration in the steering angular velocity control section 212 can be [1/(Ts+1)]×T using, for example, the first-order lag transfer function and gain.

<Second Form of Steering Angle Control>

Figure 13:
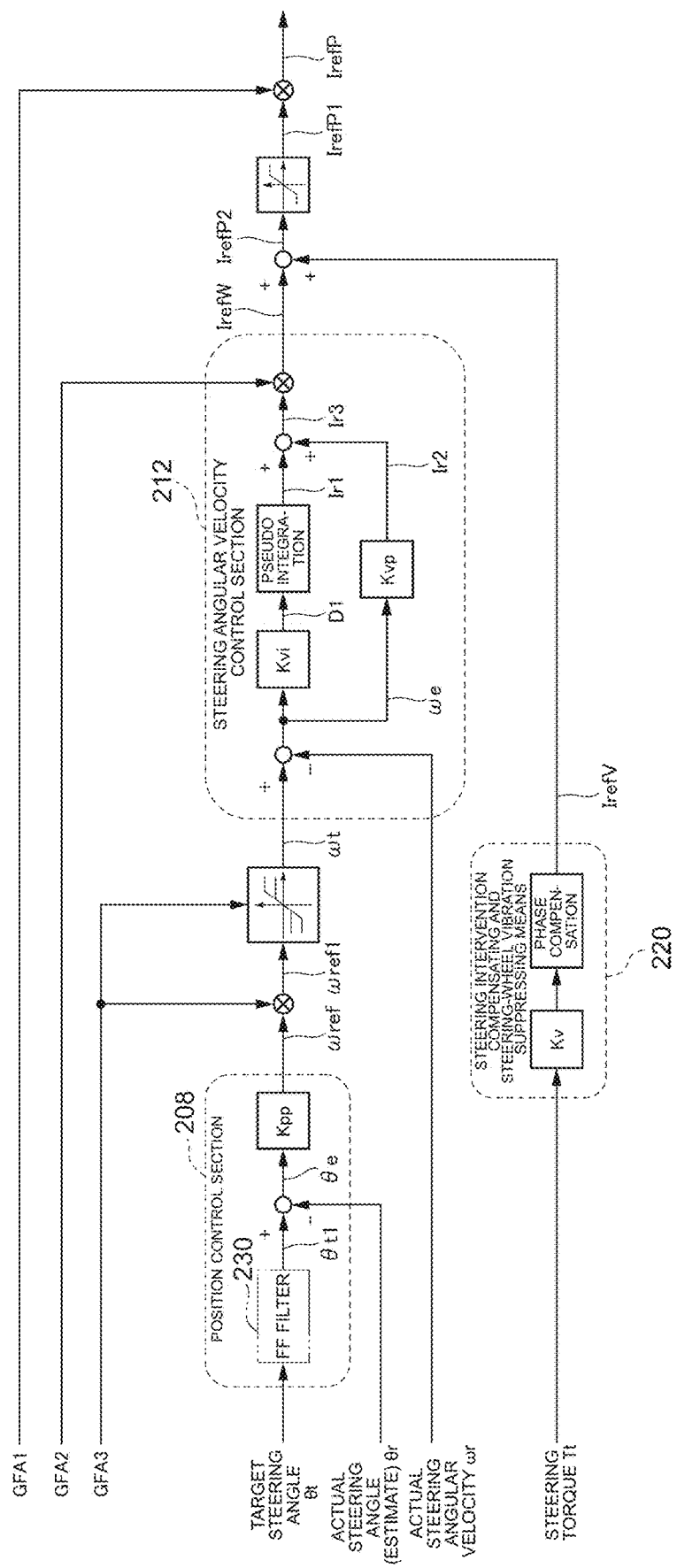
FIG. 13 is a block diagram of the steering angle control section to illustrate a second form of steering angle control.

The steering angular velocity control section 212 of the steering angle control section 200 illustrated in FIG. 13 performs PI control in steering angular velocity control, and performs a pseudo-integration in I control. More specifically, the deviation between the target steering angular velocity ωt and the actual steering angular velocity ωr is multiplied by Kvi to set the operation amount D1 proportional to the magnitude of the deviation, and further I control using the pseudo-integration is performed (see FIG. 13). Like in the first form described above, in the second form of steering angle control, the signal Ir3 after the addition is multiplied by the speed control gradual change gain GFA2, and output from the steering angular velocity control section 212 as the signal IrefW.

<Third Form of Steering Angle Control>

Figure 14:
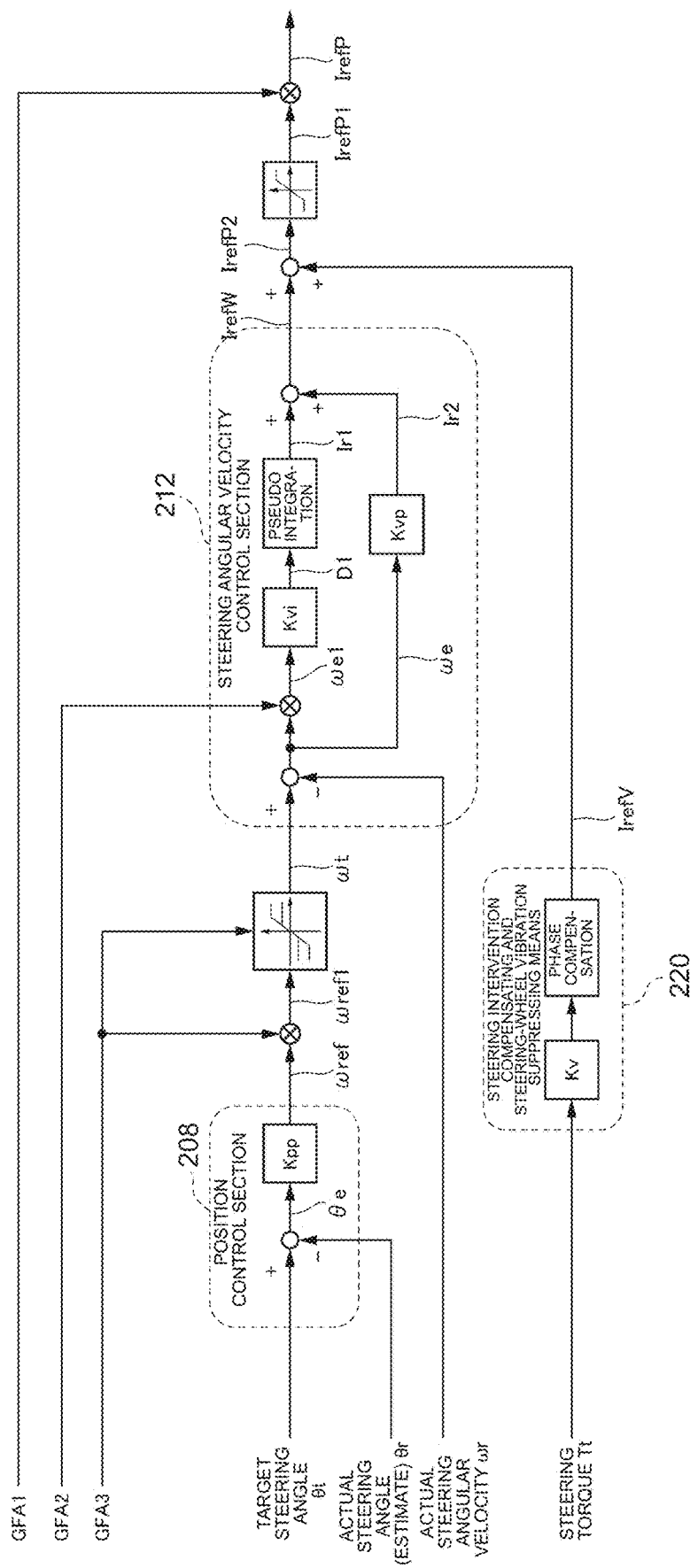
FIG. 14 is a block diagram of the steering angle control section to illustrate a third form of steering angle control.

The steering angular velocity control section 212 of the steering angle control section 200 illustrated in FIG. 14 performs PI control in steering angular velocity control, and performs a pseudo-integration in I control. In the third form of steering angle control, the deviation between the target steering angular velocity ωt and the actual steering angular velocity ωr is multiplied by the speed control gradual change gain GFA2 to generate a signal ωe1, and this signal ωe1 is multiplied by Kvi to set the operation amount D1 proportional to the magnitude of the deviation. Further, I control using the pseudo-integration is performed (see FIG. 14).

<Fourth Form of Steering Angle Control>

Figure 15:
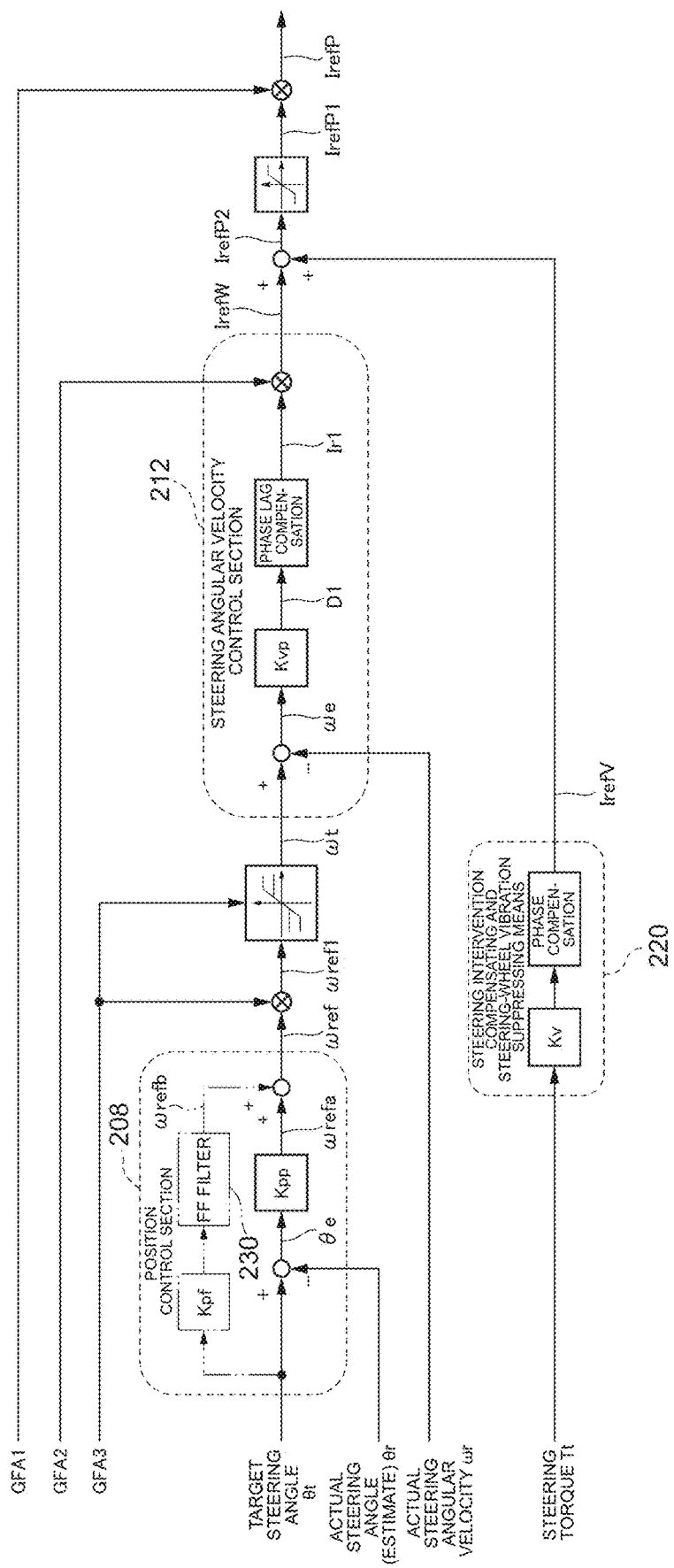
FIG. 15 is a block diagram of the steering angle control section to illustrate a fourth form of steering angle control.

The steering angular velocity control section 212 of the steering angle control section 200 illustrated in FIG. 15 performs phase-lag compensation. In the fourth form of steering angle control, the deviation between the target steering angular velocity ωt and the actual steering angular velocity ωr is multiplied by Kvp to set the operation amount D1 proportional to the magnitude of the deviation. Further, a signal Ir1 after the phase-lag compensation is multiplied by the speed control gradual change gain GFA2, and output from the steering angular velocity control section 212 as the signal IrefW (see FIG. 15).

<Fifth Form of Steering Angle Control>

Figure 16:
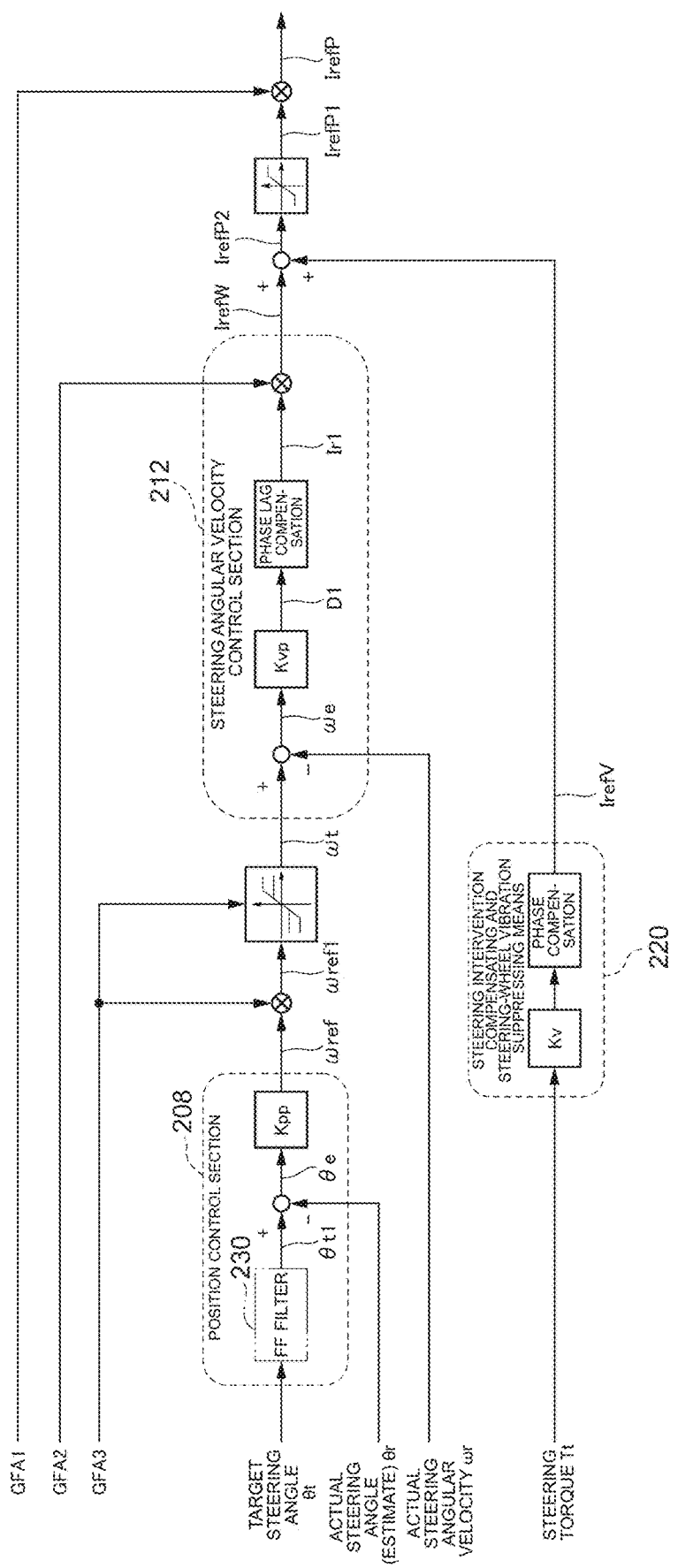
FIG. 16 is a block diagram of the steering angle control section to illustrate a fifth form of steering angle control.

The steering angular velocity control section 212 of the steering angle control section 200 illustrated in FIG. 16 performs phase-lag compensation. Like in the fourth form described above, in the fifth form of steering angle control, the deviation between the target steering angular velocity ωt and the actual steering angular velocity ωr is multiplied by Kvp to set the operation amount D1 proportional to the magnitude of the deviation. Further, the signal Ir1 after the phase-lag compensation is multiplied by the speed control gradual change gain GFA2, and output from the steering angular velocity control section 212 as the signal IrefW (see FIG. 16). PI control using the pseudo-integration is equivalently replaced with phase-lag compensation and gain.

<Sixth Form of Steering Angle Control>

Figure 17:
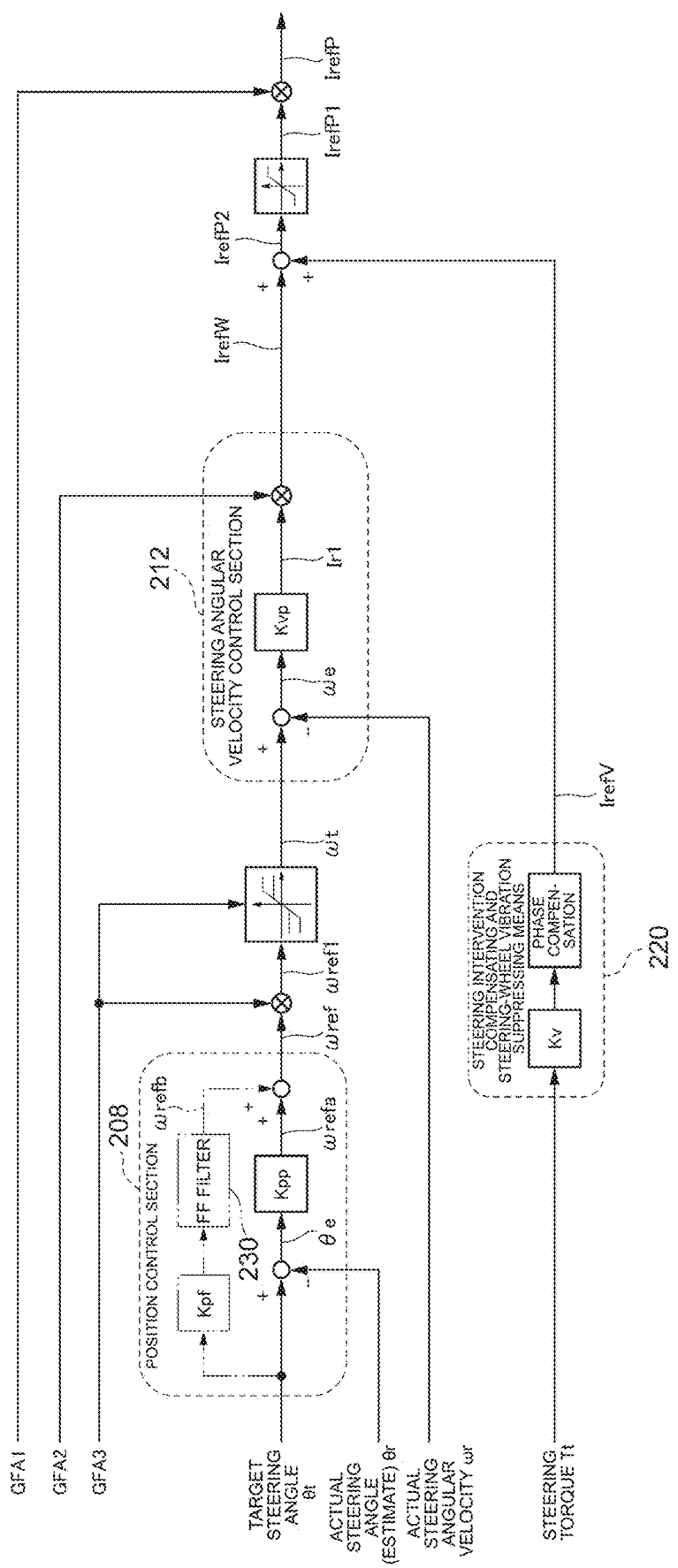
FIG. 17 is a block diagram of the steering angle control section to illustrate a sixth form of steering angle control.
Figure 18:
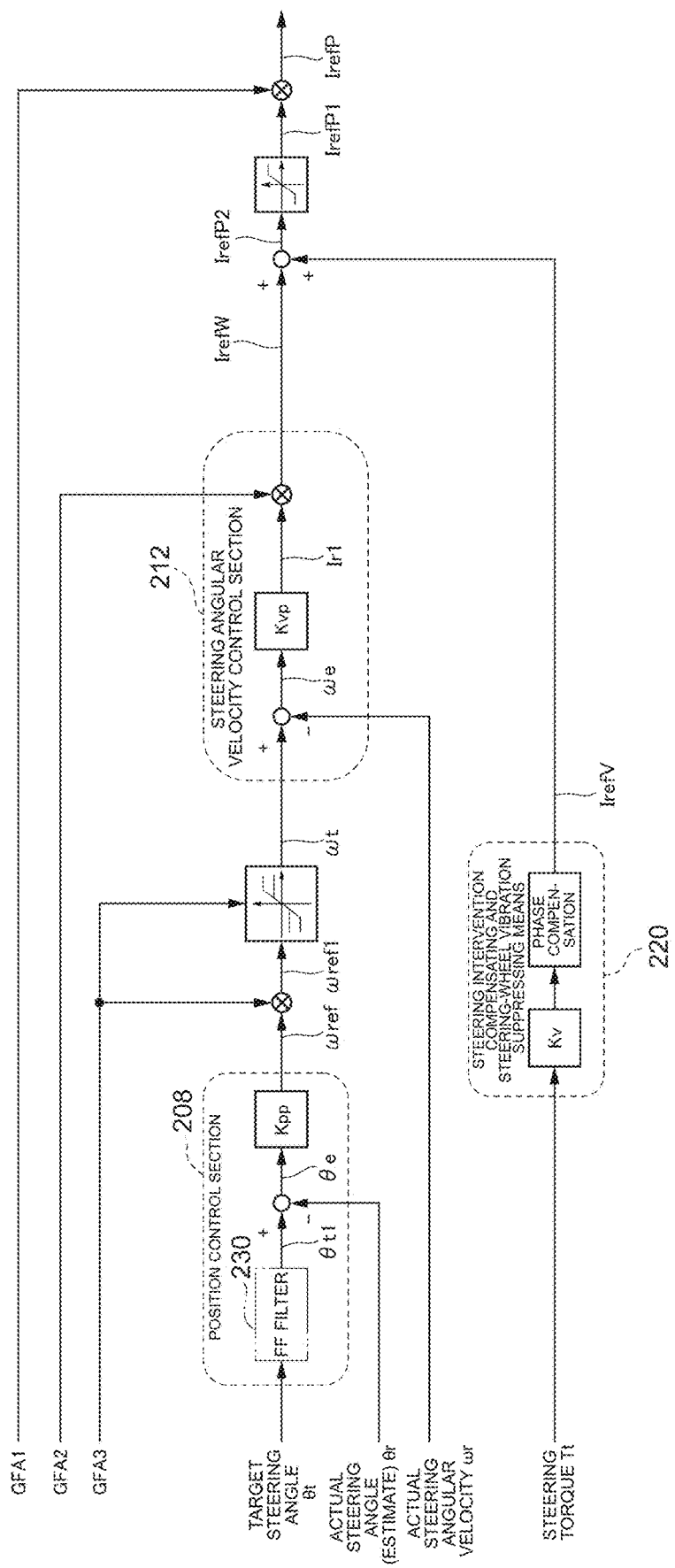
FIG. 18 is a block diagram of the steering angle control section to illustrate another example of the sixth form of steering angle control.

The steering angular velocity control section 212 of the steering angle control section 200 illustrated in FIG. 17 and FIG. 18 performs proportional control (P control). In the sixth form of steering angle control, the deviation between the target steering angular velocity ωt and the actual steering angular velocity ωr is multiplied by Kvp, and a signal Ir1 indicating an operation amount proportional to the magnitude of the deviation is multiplied by the speed control gradual change gain GFA2 and output from the steering angular velocity control section 212 as the signal IrefW (see FIG. 17 and FIG. 18).

According to each of the first to fifth forms of steering angle control described above, steering intervention without a feeling of strangeness such as a sense of getting caught can be realized even when there are no "manual input detection" and "switching operation" during autonomous driving of the vehicle. The results and the like as the evidence will be described below as Example 1 (see FIG. 19 to FIG. 21).

EXAMPLE 1

(Evidence for Solution to Problem 1 and Problem 2)

From a simulation in consideration of a driver's steering model, time responses of an actual steering angle (also called a steering-wheel angle below and denoted by sign θh. See the thin line) and a steering torque Tt (see the dashed line) with respect to a driver's target angle θarm (see the thick line in the figures) during autonomous driving (where the steering angle command value θref is fixed at 0 [deg]) are illustrated as an example in FIG. 19, and the like.

Here, a plant model used in the simulation will be described (see FIG. 22 and FIG. 23).

Figure 22:
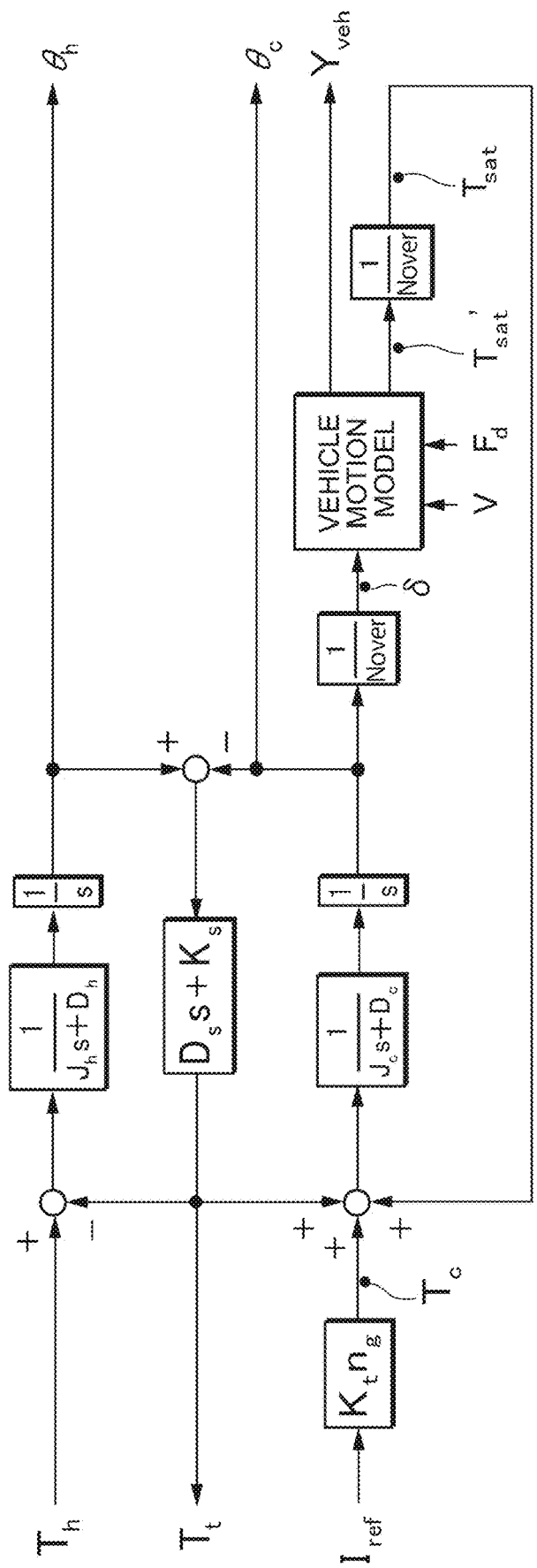
FIG. 22 is a diagram illustrating a plant model used in a simulation that takes a driver's steering model into account.

A plant model (mechanical model) used in the simulation is illustrated in FIG. 22. In this plant model, assuming that the follow-up performance of the motor electric current value with respect to the electric current command value is sufficiently quick, the detailed description of the electric current control section is omitted, and electric current command value=motor electric current is set and handled as a signal name Iref. The vehicle speed V is kept constant. The column inertia moment Jc is a sum total of the motor inertia moment and the inertia moments of the shaft, the rack & pinion, and tires converted to that of the column shaft. A motor angle θm and a column angle θc have a relation of the worm reduction gear ratio. The column angle θc and a tire turning angle δ have a relation of the ratio of overall ratio Nover. The torsion bar torque and the steering torque are the same signal, which is denoted by Tt. Here, the column to the tires are modeled as one column inertia.

Jc: column inertia [kgm^2]
Dc: column damping coefficient [Nm/(rad/s)]
Jh: steering wheel inertia [kgm^2]
Dh: steering-wheel damping coefficient [Nm/(rad/s)]
Ks: torsion bar spring constant [Nm/rad]
Ds: torsion bar damping constant [Nm/(rad/s)]
Kt: motor torque constant [Nm/A]
reduction gear ratio: ng
Tc: motor generated torque converted to that of column shaft [Nm]

Note that the motor generated torque is converted to the torque of the column shaft (in consideration of that of a reducer). Further, since the actual motor electric current is handled as being identical to the electric current command value Iref, electric current control is omitted.

Th: steering-wheel manual input torque [Nm]
Tt: torsion bar torque [Nm]
Iref: electric current command value [A]
θh: steering-wheel angle [rad]
θc: column steering angle [rad]
V: vehicle speed [m/s]
Yveh: lateral moving distance at gravity center of vehicle [m]
δ: tire turning angle [rad]
Fd: lateral external force acting on gravity center of vehicle [N]
Tsat: Tsat' converted to that of column shaft [Nm]
Tsat': moment acting around kingpin due to road surface reaction force [Nm]

A vehicle motion model will be described. Differential equations of the vehicle are as in mathematical expression 1 and mathematical expression 2.

$$mV\frac{d}{dt}\beta(t) + 2(K_f + K_r)\beta(t) + \left\{mV + \frac{2(l_f K_f - l_r K_r)}{V}\right\}\gamma(t) = 2K_f \delta(t) + F_d(t)$$ [Math. 1]

$$2(l_f K_f - l_r K_r)\beta(t) + I\frac{d}{dt}\gamma(t) + \frac{2(l_f^2 K_f + l_r^2 K_r)}{V}\gamma(t) = 2l_f K_f \delta(t) - l_d F_d(t)$$ [Math. 2]

A sideslip angle β and a yaw rate γ after Laplace transform are expressed by mathematical expression 3.

$$\begin{bmatrix}\beta(s)\\ \gamma(s)\end{bmatrix} = \begin{bmatrix} mVs + 2(K_f + K_r) & mV + \frac{2(l_f K_f - l_r K_r)}{V} \\ 2(l_f K_f - l_r K_r) & Is + \frac{2(l_f^2 K_f + l_r^2 K_r)}{V} \end{bmatrix}^{-1}$$ [Math. 3]

$$\begin{bmatrix} 2K_f \delta(s) + F_d(s) \\ 2l_f K_f \delta(s) - l_d F_d(s) \end{bmatrix}$$

The moment received by each tire from the road surface and acting around the kingpin is expressed by mathematical expression 4.

$$T'_{sat} = 2\xi K_f \left(\beta + \frac{l_f}{V}\gamma - \delta\right)$$ [Math. 4]

Lateral acceleration at the gravity center of the vehicle under an approximation condition is expressed by mathematical expression 5.

$$\alpha_y = V(s\beta + \gamma)$$ [Math. 5]

Lateral moving distance at the gravity center of the vehicle is expressed by mathematical expression 6.

$$Y_{veh} = \frac{a_y}{s^2}$$ [Math. 6]

Note that the vehicle motion model may be any model as long as the transmission characteristics from the tire turning angle δ to the moment Tsat' acting around the kingpin due to the road surface reaction force are considered. Note that the vehicle model and the steering model used in the simulation are not limited to those mentioned above, and general literatures and the like may be referred to. Further, mathematical expression 1, mathematical expression 2, mathematical expression 4, and mathematical expression 5 as relational expressions of the vehicle model are cited, for example, in *Vehicle Motion and Control* (by Masato Abe) published by Tokyo Denki University Press. The steering model is, for example, mentioned in "Study on Evaluation of Feeling of Car Steering in Consideration of Arm Musculoskeletal Characteristics" (by Daisuke Yokoi), master's thesis of Mie University.

Figure 23:
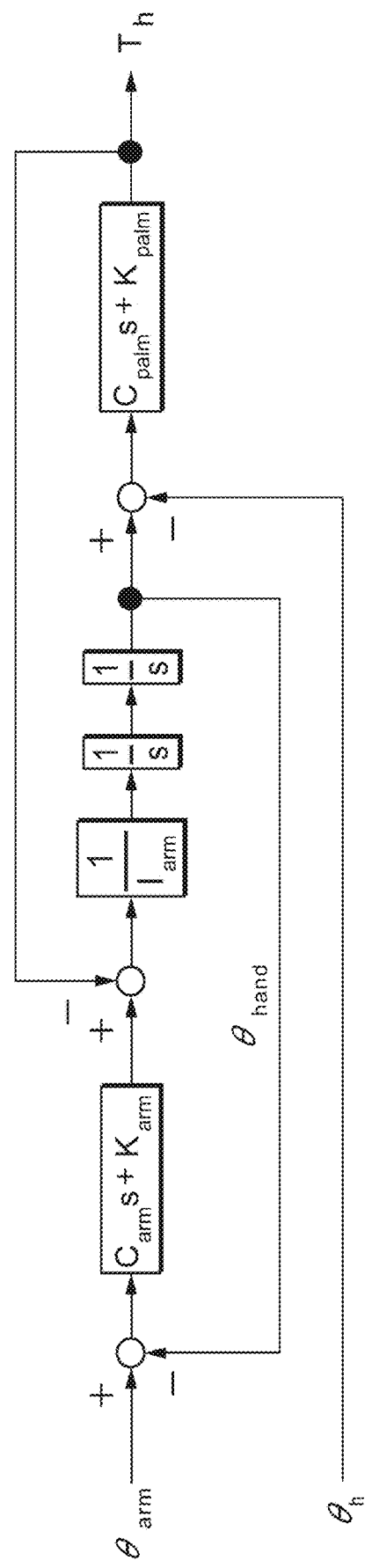
FIG. 23 is a diagram illustrating an example of the driver's steering model.

An example of the driver's steering model is illustrated in FIG. 23. In simulating steering by a driver, the steering model illustrated in FIG. 23 is used, where the steering-wheel angle θh output from the mechanical model (see FIG. 22) is input to the steering model, and the manual input torque Th output from the steering model is output to the mechanical model. Here, the target angle (driver's steering target angle) is denoted by θarm.

The conditions as an example are "pseudo-integration: assist control output gradual change gain GFT1=one time and assist map gradual change gain GFT2=three times," and "where the steering angle control output gradual change gain GFA1, the speed control gradual change gain GFA2, the speed command gradual change gain GFA3, and the steering angle command gradual change gain GFA4 are one time" as will be described later.

Figure 19:
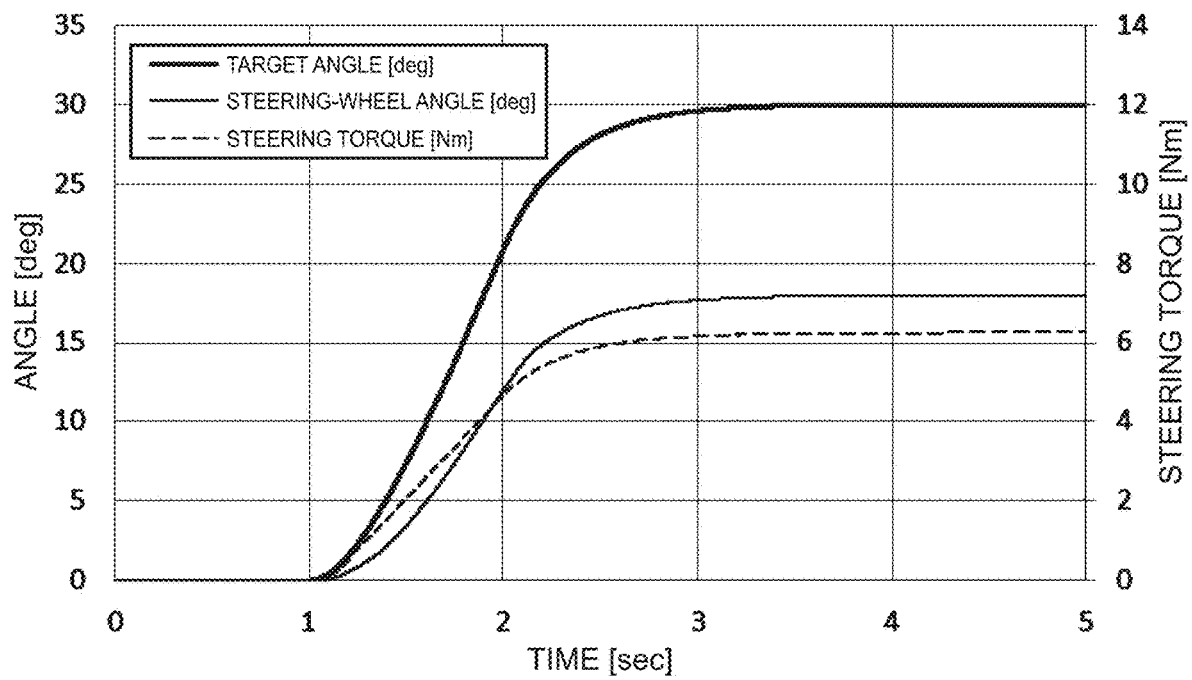
FIG. 19 is a graph representing changes in angle (target angle, steering-wheel angle) and steering torque over time to illustrate the evidence that steering intervention without a feeling of strangeness is realized.
Figure 20:
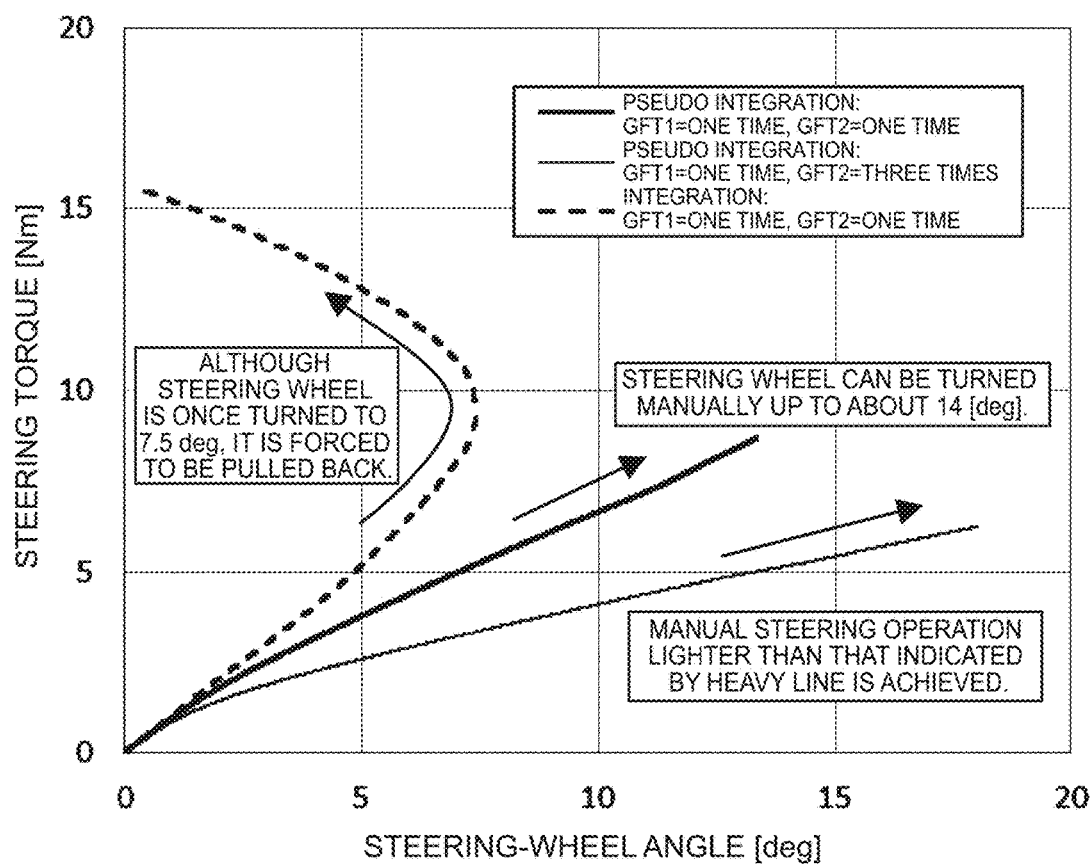
FIG. 20 is a graph representing relations between steering-wheel angle and steering torque due to differences in integration method for steering angular velocity control in Example 1 (when a pseudo-integration is performed in a steering angular velocity control section).
Figure 21:
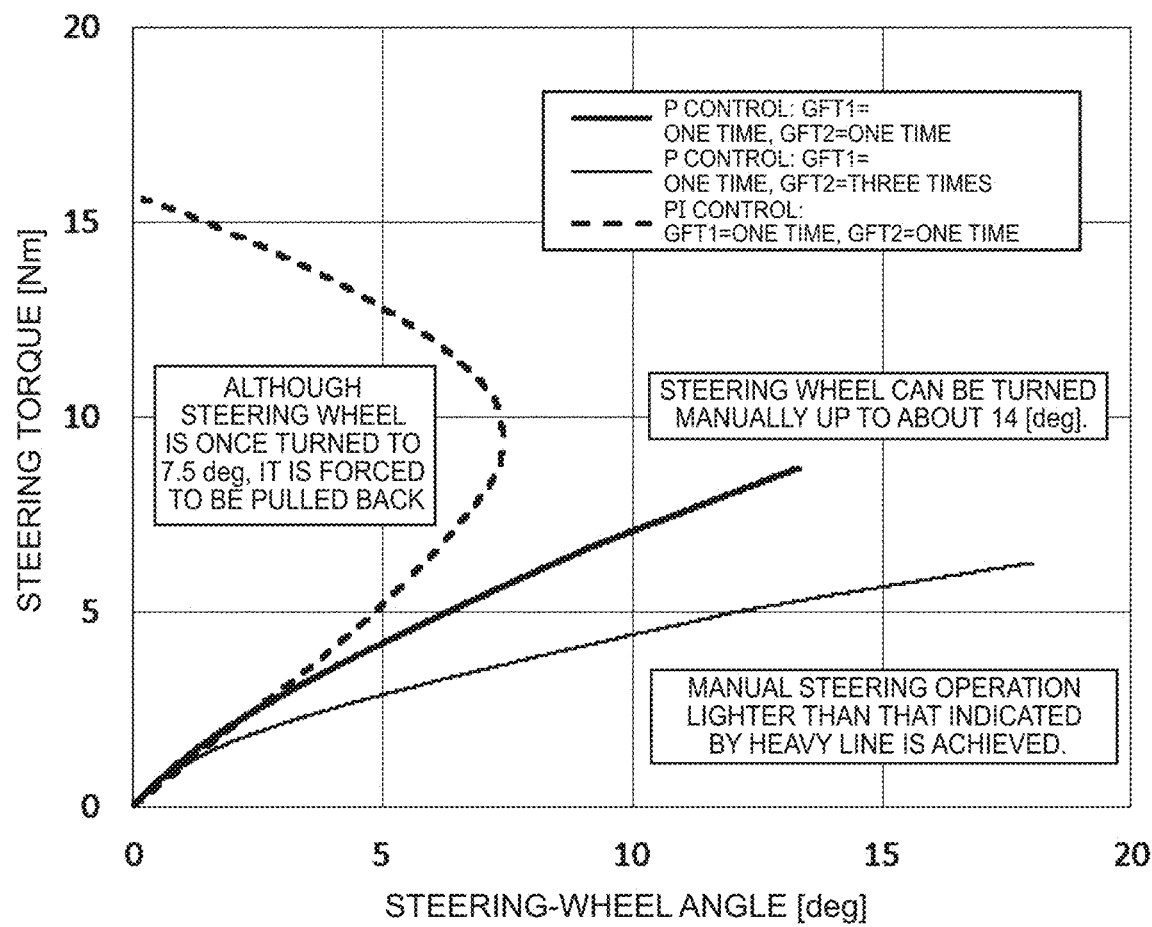
FIG. 21 is a graph representing relations between steering-wheel angle and steering torque due to differences in integration method for steering angular velocity control in Example 1 (when P control is performed in the steering angular velocity control section).

The steering-wheel angle θh and the steering torque Tt (=torsion bar torque) are compared under respective conditions when the driver's target angle θarm illustrated in FIG. 19 is input (see FIG. 19 to FIG. 21).

Thick line . . . Pseudo-integration (P control in FIG. 21): assist control output gradual change gain GFT1=one time and assist map gradual change gain GFT2=one time Thin line . . . Pseudo-integration (P control in FIG. 21): assist control output gradual change gain GFT1=one time and assist map gradual change gain GFT2=three times Dashed line . . . Pure integration (PI control in FIG. 21): assist control output gradual change gain GFT1=one time and assist map gradual change gain GFT2=one time where the steering angle control output gradual change gain GFA1, the speed control gradual change gain GFA2, the speed command gradual change gain GFA3, and the steering angle command gradual change gain GFA4 are one time.

From the thick line and the dashed line, it is found that the vehicle can be steered well when performing PI control for speed control using "pseudo-integration" (when performing P control in the case of FIG. 21). The reasons can be as follows.

In other words, the dashed line indicates that, although the steering-wheel angle θh is steered to 7.5 [deg], the velocity deviation (deviation between the steering angular velocity command value and the actual steering angular velocity) continues to be accumulated due to the pure integration of speed control PI to force the steering-wheel angle θh to return eventually to the steering angle command value θref (=0 [deg]). This further leads to generating a very large steering torque, and hence makes it difficult for the driver to steer (a steering torque over 15 [Nm] is generated at 0 [deg]). In the conventional techniques, although the assist control command value is 0 [deg] during steering angle control before switching, since this makes it more difficult for the driver to steer than that in the case of the dashed line, the description thereof is omitted. Further, in comparison with the electric power steering device according to the embodiment, GFT1=one time and GFT2=one time are set to see a difference in integration method.

In contrast, the thick line indicates that the steering wheel can be turned up to about 14 [deg], and is not made to return to the steering angle command value 0 [deg]. This results from the fact that the use of the pseudo-integration (P control in FIG. 21) limits the accumulation of the velocity deviation (no accumulation of the velocity deviation using the integration in FIG. 21). Further, in the thin line (assist map gradual change gain GFT2=three times), it can be confirmed that lighter steering than that in the thick line can be realized. It is found that an increase in assist map gradual change gain GFT2 can lead to achieving the driver's steering intervention with light steering.

Further, according to each of the first to fifth forms of steering angle control described above, use of the steering-wheel vibration removing means 206 and the steering intervention compensating and steering-wheel vibration suppressing means 220 can lead to realizing steering-wheel vibration suppression during automatic steering.

When no abnormality occurs in the angle sensor, the electric power steering device 100 according to the embodiment described so far performs steering angle control using the angle sensor, while when any abnormality is detected in the angle sensor, the electric power steering device 100 determines an estimate of the steering angle instead of using the angle sensor to perform steering angle control using the determined estimate of the steering angle. Thus, even when a steering angle abnormality occurs in the steering-wheel angle in the steering angle control mode, since the actual steering angle can be estimated accurately, the occurrence of an accident and the like can be prevented without causing any problem with the behavior of the vehicle/EPS during autonomous driving. Further, the occurrence of steering angle abnormality does not cause the driver to feel strange. In another aspect, the electric power steering device 100 according to the embodiment realizes a sophisticated human-machine interface in autonomous driving of a vehicle. In other words, a control method that reconciles steering angle control with assist control is implemented in such a manner that manual steering is realized even without "manual input detection" and "switching operation" when steering by a driver intervenes during autonomous driving to ensure a high degree of safety at the time of emergency steering by the driver. Further, a feeling of strangeness and a feeling of discomfort, such as a sense of getting caught, given to the driver at the time of switching from steering angle control to assist control are reduced. In addition, switching from assist control to steering angle control is also done smoothly without giving the feeling of strangeness to the driver.

While the aforementioned embodiment is an example as a preferred embodiment of the present invention, the present invention is not limited to this embodiment, and various modifications are possible without departing from the gist of the present invention. For example, the LPF is used in the steering-wheel vibration removing means 206 in the aforementioned embodiment, but this is just a preferred example. In addition, for example, a notch filter fitted to a steering-wheel vibration frequency (around about 10 Hz) may be used to reduce the component.

Further, primary phase-lead compensation is used in the steering intervention compensating and steering-wheel vibration suppressing means 220 in the aforementioned embodiment, but a secondary or higher-order phase compensation filter may also be used.

Further, each gradual change gain described above is not limited to that exemplified in the embodiment, and it may be updated depending on the situation. For example, the assist control output gradual change gain GFT1 and the assist map gradual change gain GFT2 are not limited to those set to 100% or more, and they may be set to values of 0% or more and less than 100% depending on the situation.

The behavior of vehicle motion when steering angle control and vehicle control are combined in the aforementioned embodiment is just an example. For example, in the simulation of FIG. 10A and FIG. 10B, since it is assumed that the behavior of vehicle control when only steering angle control is simply carried out is grasped, it is set that the assist control output gradual gain GFT1=0%. Here, the steering angle control is not to be limited to that illustrated in each of the aforementioned forms, and similar vehicle motion can be realized without using the steering angle sensor 14 as long as the control mechanism is such that actual steering angle (estimate) follows the steering angle command value. As for the vehicle control, for example, when lateral disturbance (such as crosswind) occurs, such vehicle control that the target value for the lateral position of the vehicle is modified or the like can be performed.

INDUSTRIAL APPLICABILITY

The present invention is preferably applied to electric power steering.

REFERENCE SIGNS LIST

1 . . . steering wheel
2 . . . column shaft (torsion bar)
3 . . . reduction gear
4a, 4b . . . universal joint
5 . . . pinion-rack mechanism
6a, 6b . . . tie rod 7a, 7b . . . hub unit
8L, 8R . . . steered wheel
10 . . . torque sensor
12 . . . vehicle speed sensor
14 . . . steering angle sensor
20 . . . motor
21 . . . rotation sensor
30 . . . control unit
31 . . . electric current command value calculating section
32A . . . addition section
32B . . . subtraction section
33 . . . electric current limiting section
34 . . . compensation section
35 . . . PI control section
36 . . . PWM control section
37 . . . inverter
38 . . . motor current detector
40 . . . CAN
100 . . . electric power steering device
130 . . . vehicle-side ECU
130a . . . vehicle state quantity detector
131 . . . switching command section
132 . . . target steering angle generating section
134 . . . target trajectory calculating section
135 . . . vehicle motion control section
135a . . . steering angle command value generating section
140 . . . EPS (electric power steering device) side ECU
141 . . . torque control section
142 . . . switching section
143 . . . electric current control/drive section
144 . . . motor angular velocity calculating section
145 . . . switching determination/gradual change gain generating section
146 . . . EPS state quantity detector
147 . . . assist control section
150 . . . motor
151 . . . rotation sensor
154 . . . torque sensor
160 . . . plant
200 . . . steering angle control section
201, 201a . . . steering angle calculating section
202 . . . upper and lower limit variable limiter
204 . . . variable rate limiter
206 . . . steering-wheel vibration removing means
208 . . . position control section
210 . . . speed command value upper and lower limit variable limiter
212 . . . steering angular velocity control section
214 . . . steering angle control output upper and lower limit limiter
220 . . . steering intervention compensating and steering-wheel vibration suppressing means
230 . . . FF filter
341 . . . convergence
342 . . . inertia
343 . . . self-aligning torque (SAT)
344 . . . addition section
345 . . . addition section
CM . . . compensation signal
GFA1 . . . steering angle control output gradual change gain
GFA2 . . . speed control gradual change gain
GFA3 . . . speed command gradual change gain
GFA4 . . . steering angle command gradual change gain
GFT1 . . . assist control output gradual change gain
GFT2 . . . assist map gradual change gain
IrefP1 . . . steering angle control electric current command value
Th . . . steering torque
Vs . . . vehicle speed
Flg_θh . . . steering angle abnormality determination signal
θh . . . steering-wheel angle
θm . . . motor angle
θr . . . actual steering angle (or estimate of actual steering angle)
θref . . . steering angle command value
θs . . . motor rotation angle
θt . . . target steering angle
ωr . . . actual steering angular velocity
ωref . . . steering angular velocity command value

What is claimed is:

1. A control device for an electric power steering device that applies an auxiliary steering force to a steering mechanism of a vehicle by a rotational force of a motor, the control device comprising:
a vehicle-side ECU, which comprises:
a vehicle motion control section which calculates a steering angle command value θref and modifies a target value for a lateral position of the vehicle when a disturbance such as crosswind occurs, where the steering angle command value θref calculated in the vehicle motion control section is input to a steering angle control section in an EPS-side ECU; and
the EPS-side ECU, which comprises:
the steering angle control section which controls a steering angle of the steering mechanism based on an input steering angle command value θref; and
a switching determination/gradual change gain generating section which generates gradual change gains, by which steering angle control output from the steering angle control section and assist control output from an assist control section are multiplied, and multiplies the gradual change gains to make a determination to switch between a steering angle control mode by the steering angle control section and an assist control mode by the assist control section,
wherein the steering angle control section comprises:
a steering angle calculating section which outputs a detected steering-wheel angle θh as an actual steering angle θr when an input steering angle abnormality determination signal indicates normal; and
a position control section which derives a steering angular velocity command value ωref based on an input target steering angle θt and the actual steering angle θr.

2. The control device for the electric power steering device according to claim 1,
wherein the vehicle motion control section calculates the steering angle command value θref, based on a target trajectory of the vehicle, and modifies the target trajectory of the vehicle when at least one of a plurality of disturbances, including crosswind, occurs.

3. A control device for an electric power steering device that applies an auxiliary steering force to a steering mechanism of a vehicle by a rotational force of a motor, the control device comprising:
a steering angle control section which controls a steering angle of the steering mechanism based on a steering angle command value θref; and
a switching determination/gradual change gain generating section which generates gradual change gains, by which steering angle control output from the steering angle control section and assist control output from an assist control section are multiplied, and multiplies the gradual change gains to make a determination to switch between a steering angle control mode by the steering angle control section and an assist control mode by the assist control section,
wherein the steering angle control section comprises:
  a steering angle calculating section which outputs a detected steering-wheel angle θh as an actual steering angle θr when a steering angle abnormality determination signal indicates normal; and
a position control section which derives a steering angular velocity command value ωref based on an input target steering angle θt and the actual steering angle θr.

* * * * *